(12) United States Patent
Shin et al.

(10) Patent No.: US 10,168,757 B2
(45) Date of Patent: Jan. 1, 2019

(54) METHOD AND APPARATUS FOR ADAPTIVELY MANAGING POWER

(71) Applicant: Samsung Electronics Co., Ltd., Suwon-si (KR)

(72) Inventors: Dongrak Shin, Gwangju-si (KR); Kyounghoon Kim, Seoul (KR); Wootaek Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 15/056,876

(22) Filed: Feb. 29, 2016

(65) Prior Publication Data

US 2017/0097666 A1 Apr. 6, 2017

(30) Foreign Application Priority Data

Oct. 2, 2015 (KR) .................. 10-2015-0139376

(51) Int. Cl.
  *G06F 1/26* (2006.01)
  *G06F 1/28* (2006.01)
  *G06F 13/42* (2006.01)
(52) U.S. Cl.
  CPC ............ *G06F 1/266* (2013.01); *G06F 1/263* (2013.01); *G06F 1/28* (2013.01); *G06F 13/4282* (2013.01)

(58) Field of Classification Search
  CPC ...................................................... G06F 1/266
  See application file for complete search history.

(56) References Cited

U.S. PATENT DOCUMENTS

| | | | |
|---|---|---|---|
| 2012/0072755 A1* | 3/2012 | Jun ................. | G06F 1/3221 713/340 |
| 2015/0006919 A1* | 1/2015 | Cheng .............. | G06F 1/26 713/300 |

* cited by examiner

*Primary Examiner* — Farley Abad
(74) *Attorney, Agent, or Firm* — Jefferson IP Law, LLP

(57) ABSTRACT

Various embodiments of the present disclosure relate to an adaptive power management method and apparatus. The electronic device includes: a first interface for communicating with a first external electronic device functionally connected to the electronic device; a second interface for receiving power supplied by a second external electronic device; and a processor, wherein the processor determines whether the electronic device is electrically connected to the second external electronic device through the second interface, generates state information corresponding to a result of the determination, and transmits the state information to the first external electronic device through the first interface. Furthermore, various embodiments are possible.

25 Claims, 14 Drawing Sheets

METHOD AND APPARATUS FOR ADAPTIVELY MANAGING POWER

RELATED APPLICATION(S)

This application claims priority from and the benefit under 35 U.S.C. § 119(a) of Korean Patent Application No. 10-2015-0139376, filed on Oct. 2, 2015, which is hereby incorporated by reference for all purposes as if fully set forth herein.

BACKGROUND

Various embodiments of the present disclosure relate to an electronic device, and more particularly, to a method and apparatus for adaptively managing power of an electronic device.

An electronic device, for example, a smartphone, a tablet Personnel Computer (PC), a notebook, etc., has been used in various fields for their convenience and portability. In recent years, interest has increased in external apparatuses functionally connectable to the electronic device such as, for example, an accessory apparatus (e.g., a smart watch, a docking station, etc.). Furthermore, the accessory apparatus can be connected to an auxiliary accessory apparatus such as, for example, a charging apparatus.

SUMMARY

An electronic device can recognize a connection with an external electronic device such as, for example, an accessory apparatus and/or an auxiliary accessory apparatus. For example, the electronic device can recognize a connection with the accessory apparatus and/or the auxiliary accessory apparatus through a change in a voltage of a pin (e.g., an identification terminal) in an interface unit (e.g., a connector) functionally connected to the electronic device. The accessory apparatus may include, for example, a switching circuit that can switch a resistor connected to the identification terminal according to whether the auxiliary accessory apparatus is connected or not. Since the accessory apparatus should include an additional component (e.g., a switching circuit) in order to recognize whether the auxiliary accessory apparatus is connected, a manufacturing cost of the accessory apparatus may increase. Furthermore, since the electronic device should recognize a voltage of the identification terminal, it may be difficult to differentiate the various types of external apparatuses.

Various embodiments of the present disclosure may provide, for example, a method and electronic device for recognizing whether the external apparatus is connected without an additional component (e.g., a hardware apparatus) and transmitting information on whether the external apparatus is connected. Furthermore, various embodiments may provide, for example, a method and apparatus for adaptively managing power in an electronic device.

According to various embodiments of the disclosure, an electronic device includes, for example, a first interface for communicating with a first external electronic device functionally connected to the electronic device, a second interface for receiving power supplied by a second external electronic device, and a processor. The processor may determine whether the electronic device is electrically connected to the second external electronic device, generate state information corresponding to a result of the determination, and transmit the state information to the first external electronic device.

An electronic device according to an embodiment of the present disclosure includes an interface for communicating at least one of data, first power, and second power with a first external electronic device functionally connected to the electronic device and a processor functionally connected to the interface. The processor may acquire through the interface state information related to whether the first external electronic device and the second external electronic device are connected to each other, and the electronic device is configured to receive the second power from the first external electronic device through the interface when the state information belongs to a first designated range. The processor may supply the first power from a battery of the electronic dev to the first external electronic device through the interface when the state information belongs to a second designated range.

A computer-readable recording medium according to an embodiment of the present disclosure can store a program for executing, where the executed program can control determining whether an electronic device is electrically connected to a first external electronic device, generating state information corresponding to a result of the determination, and transmitting the state information to a second external electronic device through a first pin for communicating Universal Serial Bus (USB) data to the second external electronic device functionally connected to the electronic device, by the electronic device.

A computer-readable recording medium according to an embodiment of the present disclosure can store a program for executing, where the executed program can control acquiring state information relating to whether a first external electronic device and a second external electronic device are connected to each other, through a first pin for communicating USB data, from the first external electronic device for an electronic device, receiving first power from the first external electronic device through a second pin for communicating the power to the first external electronic device when the state information belongs to a first designated range, and supplying second power to the first external electronic device through the second pin when the state information belongs to a second designated range.

Other aspects, advantages, and salient features of the disclosure will become apparent to those with knowledge in the art from the following detailed description, which, taken in conjunction with the drawings, discloses various embodiments of the present disclosure.

BRIEF DESCRIPTION OF THE DRAWINGS

Various embodiments of the present disclosure will be made more apparent from the following detailed description in conjunction with the accompanying drawings, in which.

DETAILED DESCRIPTION

Figure 1:
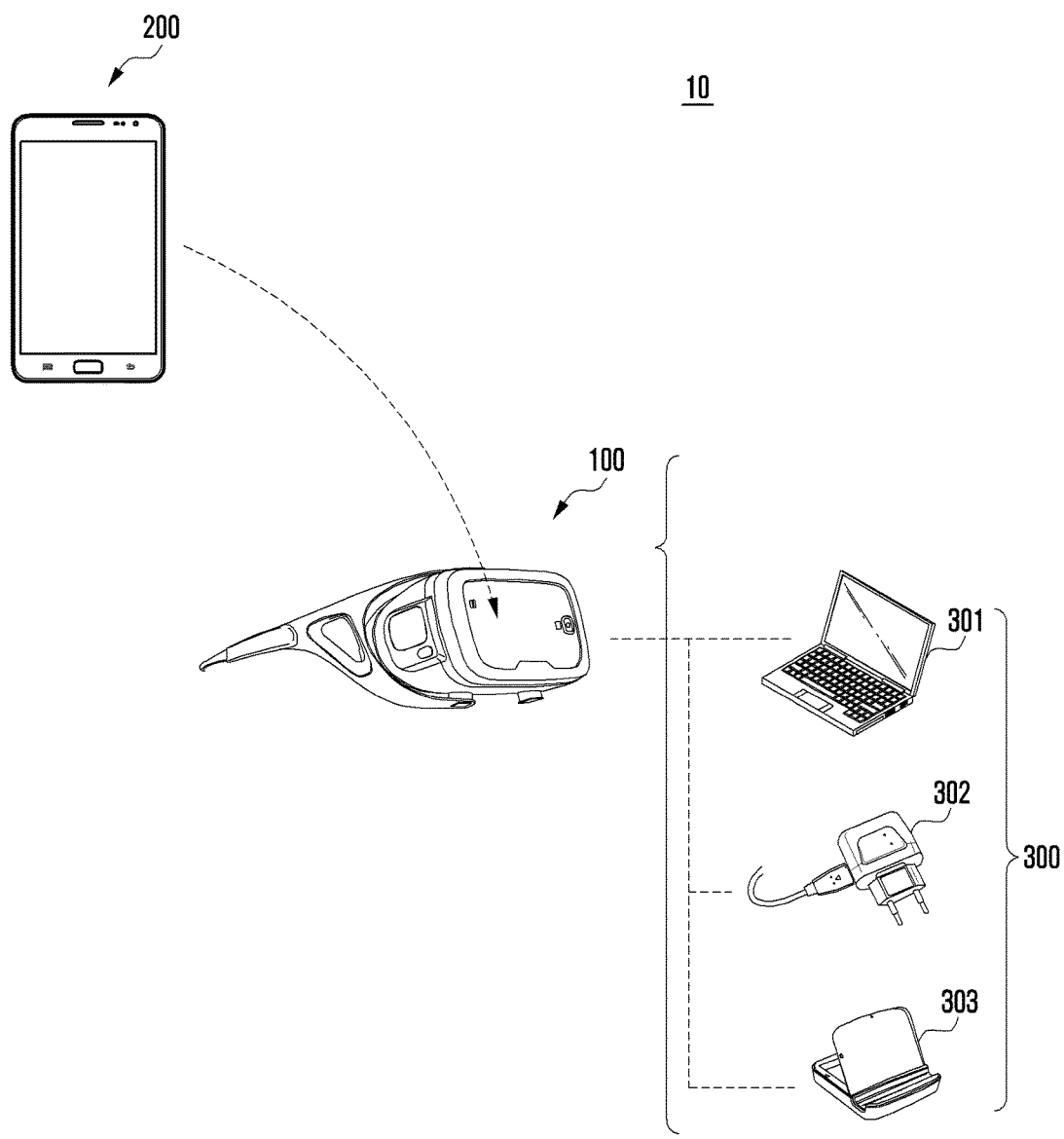
FIG. 1 illustrates an adaptive power management system according to an embodiment of the present disclosure.

Various embodiments of the present disclosure will be described with reference to the accompanying drawings. Specific embodiments are shown in the drawings and the relevant detailed descriptions are given in corresponding sections, but there is no intention to limit various embodiments of the present disclosure to the particular forms disclosed herein. Various embodiments of the present disclosure should be construed to cover all modifications, equivalents, and/or alternatives falling within the spirit and scope of the present disclosure. In the description of the drawings, like reference numerals are used to designate like elements.

As used in the present disclosure, various forms of the expressions "comprise," "may comprise," "have," "may have," "include," or "may include" are intended merely to denote existence of a certain feature (e.g., numeral, function, operation, or component, or a combination thereof), and should not be construed to exclude the existence of one or more other features. As used herein, the singular forms are intended to include the plural forms as well, unless the context clearly indicates otherwise.

The expression "A and/or B," "at least one of A and/or B," or "one or more of A and/or B" used in the present disclosure includes any or all combinations of listed words. For example, the expression "A and/or B," "at least one of A and B," or "at least one of A or B" include (1) at least one A, (2) at least one B, or (3) both at least one A and at least one B.

The expressions such as "first," "second," or the like used in this disclosure may modify various component elements in the various embodiments regardless of the sequence and/or importance, and are merely used to differentiate the elements. For example, a first user device and a second user device indicate different user devices, and do not necessarily denote sequence or importance. Accordingly, a first element may be termed a second element, and likewise a second element may also be termed a first element without departing from the scope of the present disclosure.

In the case where a first element is referred to as being "(operatively or communicatively) coupled with/to" or "connected" to a second element, it should be understood that while the first element may be directly connected to the second element, at least a third element may exist between them. Contrarily, when a first element is referred to as being "directly coupled" or "directly connected" to a second element, it should be understood that there is no third element interposed between them.

The phrase "configured to" in the present disclosure can be changed to, for example, "suitable for," "having the capacity to," "designed to," "adapted to," "made to," or "capable of." The term "configured to" does not always refer to a specifically designed hardware for a function. In other situations, the term "configured to" describes a device capable of operating with another device or other components. For example, the phrase "a processor configured to execute A, B, and C" can refer to a dedicated processor (e.g., an embedded processor) that executes the operations or a generic-purpose processor (e.g., a CPU or an application processor) that executes the operations by executing at least one software program stored in a memory device.

The terms used in the present disclosure are used to describe a specific embodiment, and are not intended to necessarily limit the scope of another embodiment. Unless defined in the disclosure, all terms used, which include technical terminologies or scientific terminologies, have the same meaning as understood by a person skilled in the art to which the present disclosure belongs. Other terms should be used as defined in a generally used dictionary and in the context of the disclosure and/or the relevant field of art. Terms defined in the present disclosure cannot be interpreted to exclude the embodiments of the present disclosure.

An electronic device as disclosed in various embodiments of the present disclosure may be, for example, a smartphone, a tablet Personal Computer (PC), a mobile phone, a video phone, an electronic book (e-book) reader, a desktop PC, a laptop PC, a netbook computer, a workstation, a server, a Personal Digital Assistant (PDA), a Portable Multimedia Player (PMP), an MP3 player, a mobile medical appliance, a camera, a wearable device, etc.

According to various embodiments, wearable devices may be an accessory type (e.g., a watch, a ring, a bracelet, a necklace, glasses, contact lenses, a Head-Mounted Device (HMD)), a fabric or clothes type (e.g., electronic clothes), a skin adhesive type (e.g., a skin pad, a tattoo), a body transplant type (e.g., an implantable circuit), etc.

According to some embodiments, an electronic device may be a smart home appliance. The smart home appliance may be, for example, a Television (TV), a Digital Video Disk (DVD) player, an audio player, an air conditioner, a cleaner, an oven, a microwave oven, a washing machine, an air cleaner, a set-top box, a TV box (for example, Samsung HomeSync™, Apple TV™, or Google TV™), game consoles, an electronic dictionary, an electronic key, a camcorder, an electronic frame, etc.

According to some embodiments, an electronic device may be one of various medical appliances (e.g., various portable medical measuring instruments (blood glucose monitoring device, heartbeat monitoring device, blood pressure monitoring device, or thermometer), magnetic resonance angiography (MRA) device, magnetic resonance imaging (MRI) device, computed tomography (CT) device, ultrasonic machines, etc.), navigation equipment, a global navigation satellite system (GNSS), an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, a point of sales (POS) of a shop, or internet of things (e.g., lightbulb, various sensors, electricity or gas meter, sprinkler, fire alarm, thermostat, streetlight, toaster, exercise equipment, boiler tank, heater, boiler, etc.).

According to some embodiments, the electronic device may include at least one of a part of furniture or a building/ structure, an electronic board, an electronic signature receiving device, a projector, or various kinds of measuring instruments (e.g., a water meter, an electric meter, a gas meter, and a radio wave meter).

The electronic device according to various embodiments of the present disclosure may be a combination of one or more of the aforementioned various devices. Furthermore, the electronic device according to various embodiments of the present disclosure may be a flexible device. It will be apparent to those skilled in the art that an electronic device according to various embodiments of the present disclosure is not limited to the aforementioned devices, and may include new electronic devices introduced due to development and advances of technology.

Hereinafter, an electronic device according to various embodiments of the present disclosure will be described with reference to the accompanying drawings. The term "user" of the present disclosure may refer to a person who uses an electronic device or a device (e.g., an artificial intelligence electronic device) that uses an electronic device.

FIG. 1 illustrates an adaptive power management system 10 according to an embodiment of the present disclosure.

Referring to FIG. 1, the adaptive power management system 10 according to an embodiment of the present disclosure may include an electronic device 100 and first and second external electronic devices 200 and 300.

The electronic device 100 may include, for example, an accessory apparatus functionally connected to the first external electronic device 200. For example, the electronic device 100 may include a virtual reality device. However, the electronic device 100 according to an embodiment of the present disclosure is not limited to the virtual reality device. For example, the electronic device 100 may include a USB hub or a docking station. Furthermore, although the electronic device 100 is displayed distinguishably from the first external electronic device 200, the two devices may be implemented as one device. For example, the first external electronic device 200 may form at least a part of the electronic device 100 or may be configured inside the electronic device 100.

The first external electronic device 200 may be functionally connected to the electronic device 100. For example, the first external electronic device 200 may be a smartphone. However, the first external electronic device 200 according to an embodiment of the present disclosure is not limited to the smartphone. For example, the first external electronic device 200 may be a tablet PC, a Personal Digital Assistant (PDA), etc.

The second external electronic device 300 may be, for example, an auxiliary accessory apparatus functionally connected to the first external electronic device 200. For example, the second external electronic device 300 may be a device that can supply power to other electronic devices. The charging device may be, for example, a notebook 301, a Travel Adaptor (TA) 302, an auxiliary battery 303, etc.

Figure 10:
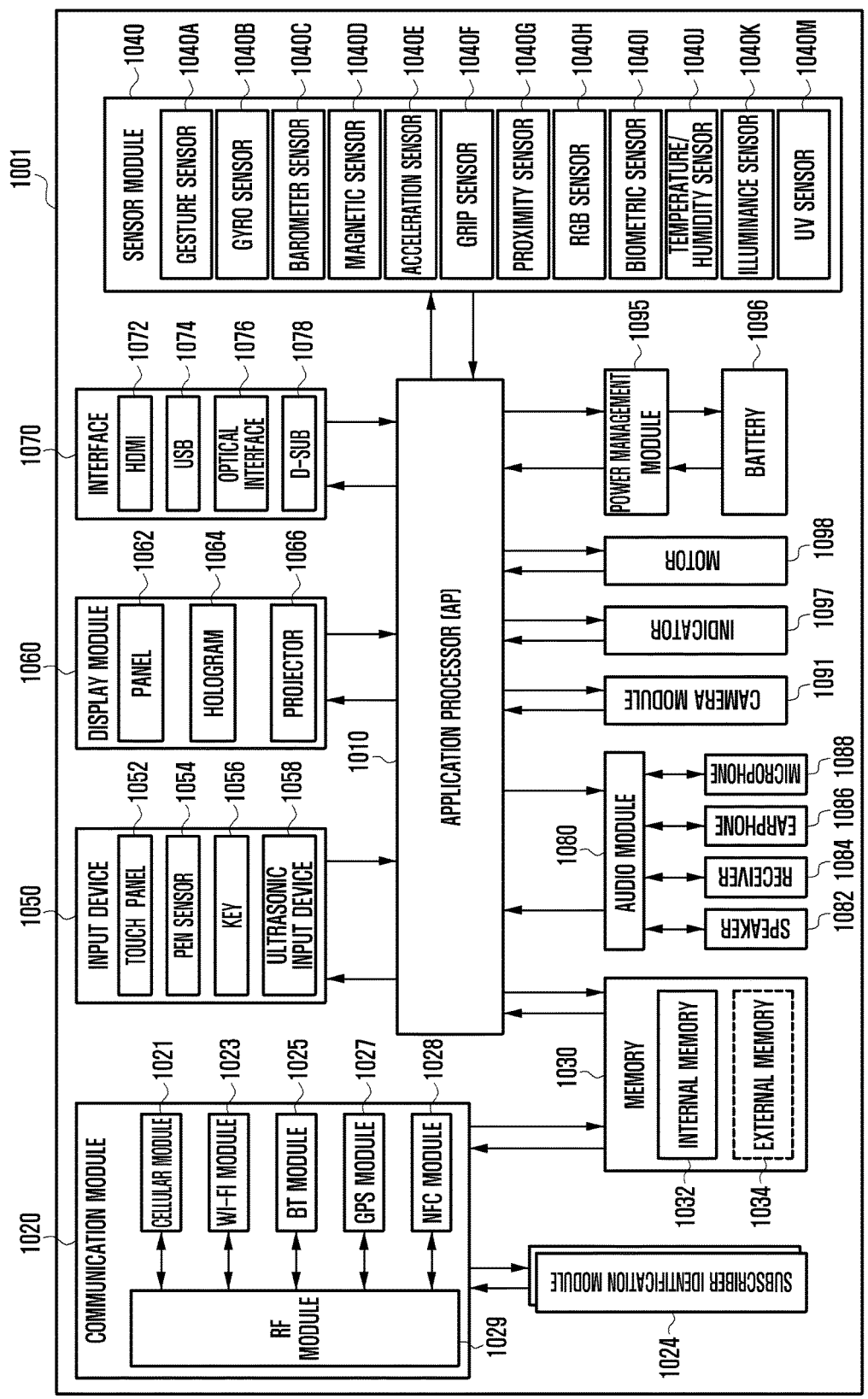
FIG. 10 is a block diagram of an electronic device according to various embodiments of the present disclosure.

The electronic device 100 and the first external electronic device 200 may be connected to each other through, for example, a USB communication interface (USB 1074 in FIG. 10). The first external electronic device 200 can operate as a USB host and the electronic device 100 can operate as a USB client, or vice versa.

The electronic device 100 can receive power supplied by the first external electronic device 200 when connected to the first external electronic device 200. The first external electronic device 200 can operate as a USB host and the electronic device 100 can operate as a USB client, or vice versa. For example, the electronic device 100 can receive power supplied by the first external electronic device 200 through an electric power terminal (e.g., V_BUS) of a USB interface. Accordingly, the electronic device 100 can operate using power supplied by the first external electronic device 200.

The electronic device 100 can also, for example, receive power from the second external electronic device 300 when it is electrically connected to the second external electronic device 300. Since the electronic device 100 can now operate using power supplied by the second external electronic device 300, and may request termination of power supply to the first external electronic device 200. For example, when a connection with the second external electronic device 300 is detected, the electronic device 100 can transmit to the first external electronic device 200 state information notifying that the second external electronic device 300 is connected. The state information can be transmitted to the first external electronic device 200 through a data communication terminal (e.g., D+, D− or Rx, Tx, etc.).

The data communication terminal may include, for example, a positive data communication terminal D+ and a negative data communication terminal D− of a USB interface. The electronic device 100 can, for example, supply power to the first external electronic device 200 when electrically connected to the second external electronic device 300 that can supply power. In an embodiment, the first external electronic device 200 can still operate as a USB host and the electronic device 100 can still operate as a USB client. For example, the electronic device 100 can supply power to the first external electronic device 200 through an electric power terminal (e.g., V_BUS) of a USB interface. The first external electronic device 200 can operate using power supplied by the electronic device 100.

The state information may be, for example, a data type corresponding to a USB device class communicating with a keyboard, a mouse, a touch, a Virtual Reality (VR) sensor, an audio or video apparatus, etc. The state information may be generated using, for example, one of a key value, a mouse coordinate value, a touch coordinate value, a VR sensor value, and an audio or video apparatus control signal value. For example, when the keyboard device class is used for state information, upon detecting a connection to the second external electronic device 300 the electronic device 100 can generate as state information a key value (e.g., 0x2fd or 0x2fe) corresponding to a preconfigured key as if the preconfigured key is pressed. The generated key value may then be transmitted to the first external electronic device 200 through a data communication terminal.

The state information may have different values in cases where the second external electronic device 300 is connected after the electronic device 100 and the first external electronic device 200 are already connected to each other, and in cases where the first external electronic device 200 is connected after the electronic device 100 and the second external electronic device 300 are already connected to each other. For example, when the second external electronic device 300 is connected after the electronic device 100 and the first external electronic device 200 are connected to each other, the state information may be "0x2fd." In a case where the first external electronic device 200 is connected after the electronic device 100 and the second external electronic device 300 are connected to each other, the state information may be "0x2fe."

According to an embodiment, part of power received from the second external electronic device 300 can be used, for example, to operate the electronic device 100, and the remainder of the received power can be supplied to the first external electronic device 200 through the power terminal. For example, the first external electronic device 200 can operate and/or charge its battery using power of the second external electronic device 300 supplied through the electronic device 100. The first external electronic device 200 may operate as a USB host and the electronic device 100 may operate as a USB client.

In this way, the electronic device 100 according to an embodiment of the present disclosure can transmit state information to the first external electronic device 200 through data communication (e.g., software information) without an additional component (e.g., a hardware apparatus), notifying the first external electronic device 200 that the second external electronic device 300 is connected.

According to an embodiment, the electronic device 100, the first external electronic device 200, and the second external electronic device 300 can be connected to each other through various communication interfaces. For example, the electronic device 100 may include a High Definition Multimedia Interface (HDMI) (HDMI 1072 of FIG. 10), an optical interface (optical interface 1076 in FIG. 10), a D-SUB (D-SUB 1078 in FIG. 10), and a lightning terminal (not shown), and can be connected to the first external electronic device 200 or the second external electronic device 300 on the basis of at least one of the HDMI, the optical interface, the D-SUB, and the lightning terminal.

Figure 2A:
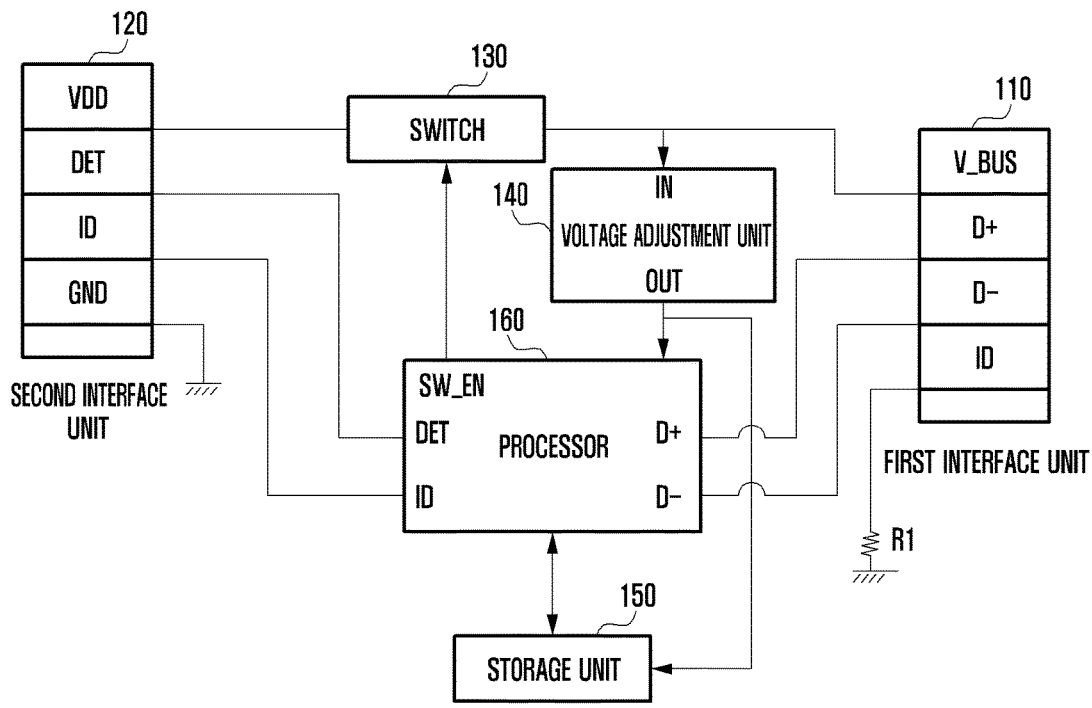
FIGS. 2A to 2C are block diagrams illustrating an electronic device according to various embodiments of the present disclosure.
Figure 2B:
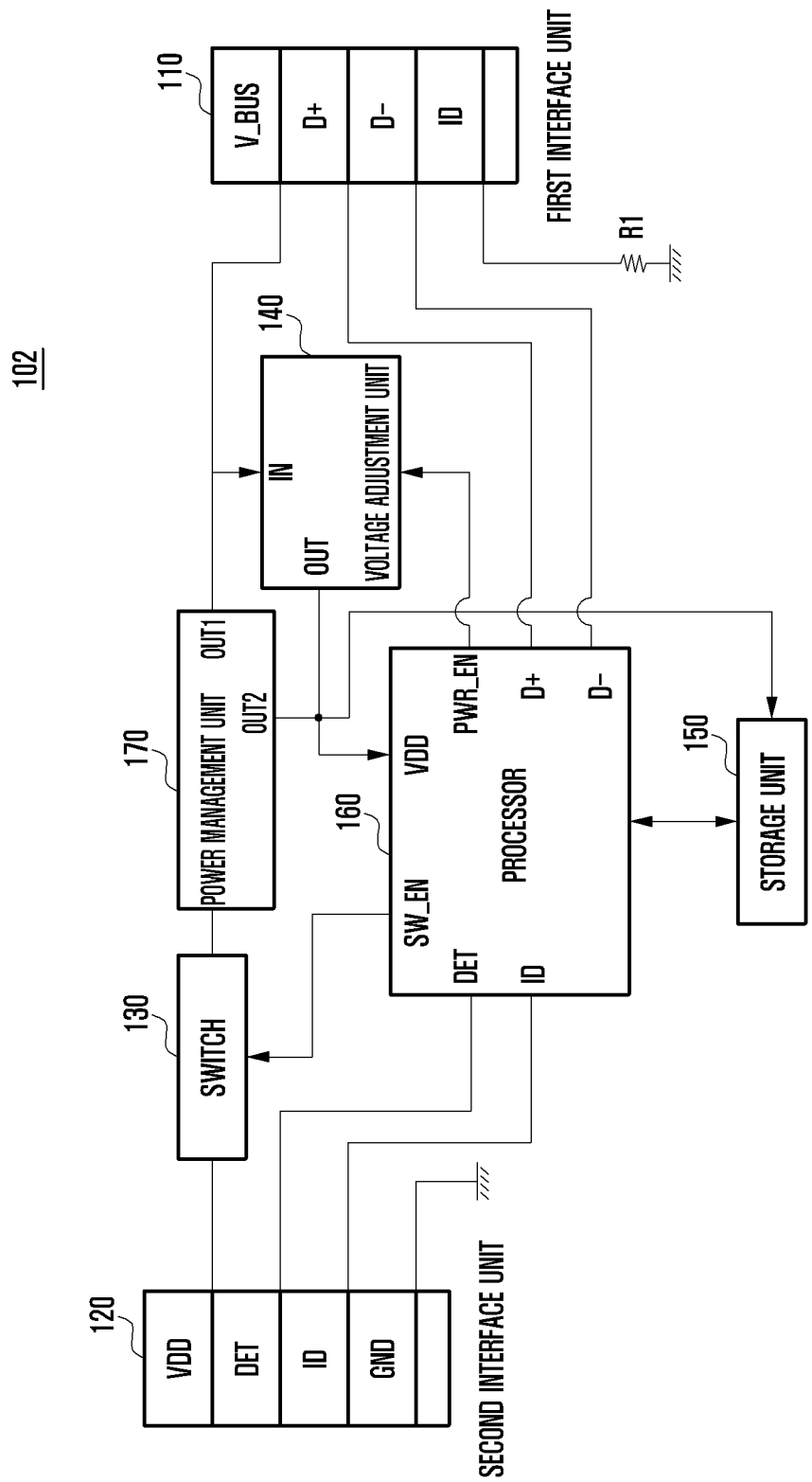
Figure 2C:
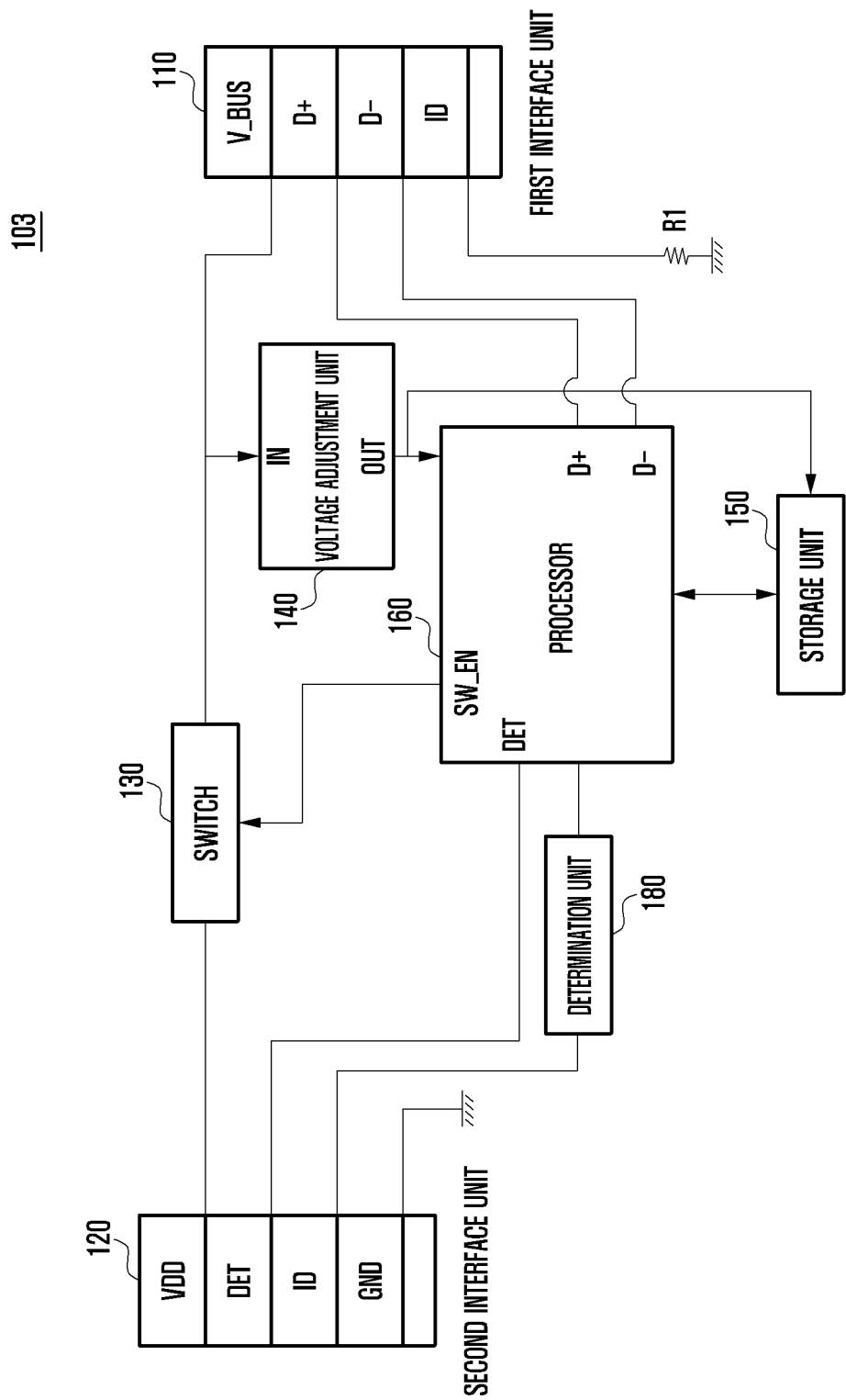

FIGS. 2A to 2C are block diagrams illustrating first, second, and third electronic devices 101, 102, and 103 according to an embodiment of the present disclosure. The first electronic device 101, the second electronic device 102, and the third electronic device 103 may all be considered to be variants of the electronic device 100.

Referring to FIG. 2A, the first electronic device 101 according to an embodiment of the present disclosure may include a first interface unit 110, a second interface unit 120, a switch 130, a voltage adjustment unit 140, a storage unit 150, and a processor 160.

The first interface unit 110 may include an apparatus, such as, for example, a connector for functionally connecting to the first external electronic device 200. The first interface unit 110 may support, for example, a USB standard. For example, the first interface unit 110 may include an identification terminal ID for identifying a type of the first electronic device 101, data communication terminals (e.g., D+ and D−) for data communication with an external electronic device (e.g., the first external electronic device 200), and a power terminal V_BUS for supply or reception of power and a ground terminal GND (not illustrated). The data communication terminal (e.g., D+ and D−) can be collectively called, for example, a first pin, and the identification terminal ID can be called a second pin. Furthermore, the power terminal V_BUS can be called a third pin.

The identification terminal ID can be connected to, for example, an identification resistor R1. The value of the identification resistor R1 can be changed according to the type of the first electronic device 101. For example, the first external electronic device 200 can recognize the type of the first electronic device 101 by the voltage across the identification resistor R1. The identification terminal ID may also be, for example, a terminal for transmitting/receiving a digital ID. The value of the digital ID can be changed according to the type of the first electronic device 101. For a USB C type connector, a Configuration Channel (CC) terminal operates as a digital ID transmission/reception terminal.

According to some embodiments, the identification terminal ID may not be included in the first electronic device 101. For example, although the identification terminal ID is illustrated in FIG. 2A, the first interface unit 110 of the first electronic device 101 can be implemented in, for example, the data communication terminals (e.g., D+ and D−), the power terminal V_BUS, or the ground terminal GND (not illustrated). The first electronic device 101 can transmit the type of the first electronic device 101 to an external electronic device (e.g., the first external electronic device 200) through various widely-known schemes without using the identification terminal ID of the first interface unit 110.

According to an embodiment, the first electronic device 101 can transmit/receive information related to an external electronic device (e.g., the first external electronic device 200) through the data communication terminals (e.g., D+ and D−, or Tx+/− and Rx+/−). Although only the data communication terminals D+ and D− for USB 2.0 are illustrated in the drawing, the data communication terminals may be the data communication terminals Tx+/− and Rx+/− for USB 3.x or more (SuperSpeed). Although the data communication terminals D+ and D− are mentioned as examples of data communication terminals below, the data communication terminals are not limited to the corresponding terminals, and other data communication terminals such as Tx and Rx can be employed as the data communication terminals.

For example, the first electronic device 101 can generate information (e.g., a key value) indicating the type of the first external electronic device 200 and transmit the information to the second external electronic device 300. Furthermore, the first electronic device 101 can receive from the first external electronic device 200 through the data communication terminals (e.g., D+ and D− or Tx+/− and Rx+/−) information indicating the type of the first external electronic device 200.

According to an embodiment, the first electronic device 101 can transmit the state information through the data communication terminals (e.g., D+ and D− or Tx+/− and Rx+/−), so that the first electronic device 101 can transmit accurate information as compared with transmitting state information through switching of the identification resistor used in the related art. For example, since the processor 160 in the first electronic device 101 uses data (software information), the processor 160 can transmit the state information without using additional components to switch the identification resistor. Furthermore, the processor 160 can transmit the state information without an error occurring due to an error of the identification resistor (e.g., an error resulting from a deviation of the resistor value).

The second interface unit 120 may include apparatus such as, for example, a connector for functionally connecting to the second external electronic device 300. For example, the second interface unit 120 may include a power terminal VDD for supplying power, a detection terminal DET for detecting a connection to the second external electronic device 300, an identification terminal ID for recognizing the type of the second external electronic device 300, and/or a ground terminal GND. In various embodiments, the identification terminal ID may not be included in the second interface unit 120.

According to an embodiment, the first interface unit 110 and the second interface unit 120 may both support USB interface standards. The switch 130 may be an ON/OFF switch for connecting or interrupting a path. For example, the switch 130 can connect or interrupt a path between the power terminal V_BUS of the first interface unit 110 and the power terminal VDD of the second interface unit 120 under control of the processor 160. The switch 130 can be switched on when the second external electronic device 300 is connected to the first electronic device 101 and switched off when the second external electronic device 300 is not connected to the first electronic device 101.

The voltage adjustment unit 140 can, for example, supply power to each component of the first electronic device 101. The voltage adjustment unit 140 can output a preconfigured voltage (e.g., 3.0 V). For example, the voltage adjustment unit 140 may be a Low Drop-Out voltage regulator (LDO).

The voltage adjustment unit 140 according to an embodiment of the present disclosure can receive power of the first external electronic device 200 or the second external electronic device 300 to output the preconfigured voltage (e.g., 3.0 V). When only the first external electronic device 200 is connected to the first electronic device 101 without a connection to the second external electronic device 300, the voltage adjustment unit 140 can receive power supplied through the power terminal V_BUS of the first interface unit 110 to output the preconfigured voltage. When the second external electronic device 300 is connected to the first electronic device 101, the voltage adjustment unit 140 can receive power supplied by the second external electronic device 300 through the power terminal VDD of the second interface unit 120 to output the preconfigured voltage.

The storage unit 150 can store an Operating System (OS) of the first electronic device 101 as well as application programs necessary for other optional functions such as, for example, an audio play function, an image or video display function, etc. The storage unit 150 according to an embodiment of the present disclosure can store various kinds of information and programs necessary for controlling the adaptive power management method. For example, the program may include a routine for detecting connection to the second external electronic device 300, a routine for controlling the switch 130 according to whether the second external electronic device 300 is connected, a routine for generating state information of the connection to the second external electronic device 300, etc.

The processor 160 can, for example, control operation of the first electronic device 101 and communication among internal blocks of the first electronic device 101, and perform data processing function for processing data. For example, the processor 160 may correspond to a Central Processing Unit (CPU), an Application Processor (AP), a Micro Controller Unit (MCU), a Micro Processor Unit (MPU), etc. The processor 160 may be embodied as a single core processor or a multi-core processor.

The processor 160 according to an embodiment of the present disclosure may be powered by the output voltage OUT of the voltage adjustment unit 140. The processor 160 can switch on the switch 130 when the connection to the second external electronic device 300 is detected. For example, the processor 160 may include a detection terminal DET and/or a switch control terminal SW_EN. The detection terminal DET and/or the switch control terminal SW_EN may be a General Purpose Input/Output (GPIO) terminal.

According to an embodiment, the first electronic device 101 can recognize the type of the second external electronic device 300 through the detection terminal DET of the second interface unit 120 and/or the identification terminal ID of the second interface unit 120. According to an embodiment, the first electronic device 101 can transmit information (e.g., state information) relating to the type of the second external electronic device 300 to the first external electronic device 200 through the first interface unit 110. For example, the first electronic device 101 can transmit/receive the state information through the data communication terminal (e.g., D+ and D−) of the first interface unit 110. The state information may include a key value (e.g., 0x3f3, 0x4ff, etc.) indicating the type of the second external electronic device 300. The processor 160 can, for example, generate state information indicating connection to the second external electronic device 300 when the connection to the second external electronic device 300 is detected, and transmit the state information to the first external electronic device 200 through the data communication terminals (e.g., D+ and D−) of the first interface unit 110. Furthermore, the processor 160 can also transmit a start charging message when transmitting the state information.

The processor 160 can switch off the switch 130 when disconnection from the second external electronic device 300 is detected.

Although not illustrated in FIG. 2A, the first electronic device 101 according to an embodiment of the present disclosure may further selectively include input modules such as a touch pad, a button key, a touch key, a digital music reproduction module, and various sensor modules such as an infrared ray sensor module and an illuminance sensor module. Alternatively, the first electronic device 101 according to an embodiment of the present disclosure may further include components equivalent to the above-described elements.

Referring to FIG. 2B, the second electronic device 102 according to an embodiment of the present disclosure may include a first interface unit 110, a second interface unit 120, a switch 130, a voltage adjustment unit 140, a storage unit 150, a processor 160 and a power management unit 170.

The second electronic device 102 according to an embodiment of the present disclosure may have a configuration similar to that of the first electronic device 101, to which the power management unit 170 is added. Thus, description of the components duplicated with the first electronic device 101 will be omitted.

The power management unit 170 may include, for example, a Power Management Integrated Circuit (PMIC). The power management unit 170 can, for example, be activated when connected to the second external electronic device 300. The power management unit 170 can supply power to the second electronic device 102 and the first external electronic device 200 by properly distributing the power supplied by the second external electronic device 300. The power management unit 170 may include, for example, a plurality of output terminals. The power management unit 170 can, for example, supply power to the first external electronic device 200 through a first output terminal OUT1, and supply power to the processor 160 and the storage unit 150 through a second output terminal OUT2. The first output terminal OUT1 can output a voltage (e.g., 5V) for charging a battery of the first external electronic device 200, and the second output terminal OUT2 can output a voltage (e.g., 3V) for the processor 160 and the storage unit 150 of the second electronic device 102. In this way, the second electronic device 102 can efficiently and stably use power supplied by the second external electronic device 300 through the power management unit 170.

The power management unit 170 can control the second output terminal OUT2 to supply power to the second electronic device 102 as a priority. Accordingly, when power consumed by the first external electronic device 200 is large, the power management unit 170 can limit power to the first output terminal OUT1 to ensure sufficient power for the second electronic device 102. The power management unit 170 may include an OverVoltage Clamp (OVC) circuit (not illustrated) for limiting power to the first output terminal OUT1. Although not shown, one location for the OVC circuit may be between the first output terminal OUT1 and the power terminal V_BUS of the first interface unit 110.

According to an embodiment, the second electronic device 102 can prevent a problem where the first external electronic device 200 is provided too much charging current so that the second electronic device 102 may malfunction due to lack of current. The processor 160 can, for example, disable the voltage adjustment unit 140 when the second external electronic device 300 is connected, and enable the voltage adjustment unit 140 when the second external electronic device 300 is not connected. Accordingly, the processor 160 can use output power of the power management unit 170 when the second external electronic device 300 is connected, and use output power of the voltage adjustment unit 140 when the second external electronic device 300 is not connected.

According to an embodiment, the second electronic device 102 can generate information on an operation state of the power management unit 170 or the voltage adjustment unit 140 as state information (e.g., a key value) when the second external electronic device 300 is connected or disconnected. This state information can be transmitted to the first external electronic device 200.

Referring to FIG. 2C, the third electronic device 103 according to an embodiment of the present disclosure may include a first interface unit 110, a second interface unit 120, a switch 130, a voltage adjustment unit 140, a storage unit 150, a processor 160 and a determination unit 180.

The third electronic device 103 according to an embodiment of the present disclosure may have a configuration similar to that of the first electronic device 101, to which the determination unit 180 is added. Thus, description of the components duplicated with the first electronic device 101 will be omitted.

The determination unit 180 can, for example, determine the type of the second external electronic device 300 electrically connected through the second interface unit 120. For example, the determination unit 180 can identify whether the connected second external electronic device 300 is a travel adaptor, a high-speed charger, an auxiliary battery, a notebook computer, or a desktop computer. According to some embodiments, the determination unit 180 can determine a travel adaptor as an apparatus according to the charging current (e.g., maximum charging current).

The processor 160 of the third electronic device 103 can, for example, transmit information on the charging current that can be used by the first external electronic device 200 according to the maximum charging current of the second external electronic device 300. For example, the processor 160 can process information on the maximum charging current of the second external electronic device 300 or information on the amount of charging current available to the first external electronic device 200 as state information (e.g., a key value) and transmit the state information to the first external electronic device 200 through the data communication terminals (e.g., D+ and D−).

According to an embodiment, the first external electronic device 200 can generate information on the charging current it may be requesting, and transmit the information to the processor 160 of the second electronic device 102 through the data communication terminals (e.g., D+ and D−). Accordingly, the processor 160 can provide the requested charging current, if possible, to the first external electronic device 200.

The processor 160 can, for example, process information on the type of the second external electronic device 300 determined by the determination unit 180 as state information (e.g., a key value), and transmit the state information to the first external electronic device 200 through the data communication terminals (e.g., D+ and D−). According to an embodiment, the third electronic device 103 may be able to prevent the case where excessively use of power by the first external electronic device 200 causes a temporary drop in the output voltage of the voltage adjustment unit 140, thus causing the third electronic device 103 to malfunction.

Although not illustrated in FIG. 2C, the third electronic device 103 may further include the power management unit 170, like the second electronic device 102. The power management unit 170 included in the third electronic device 103 can perform a function identical to or similar to that of the power management unit 170 of the second electronic device 102.

According to various embodiments, the first interface unit 110 and/or the second interface unit 120 illustrated in the first, second, and third electronic devices 101, 102, and 103 may include an additional terminal other than the identification terminal ID, the data communication terminals (e.g., D+ and D−), the power terminal V_BUS, or the ground terminal GND (not illustrated). For example, the first, second, and third electronic devices 101, 102 and 103 may include an interface (e.g., a communication interface) for communicating with an external electronic device, and terminals included in the first interface unit 110 and/or the second interface unit 120 can be changed according to the communication interface (e.g., the HDMI (the HDMI 1072 of FIG. 10), the optical interface (the optical interface 1076 of FIG. 10), the D-SUB (the D-SUB 1078 of FIG. 10), or the lighting terminal interface (not illustrated)).

According to various embodiments, although a configuration is illustrated in which all components of the first, second, and third electronic devices 101, 102 and 103 are included in one electronic device, the various embodiments are not limited thereto. For example, at least some of the components of the first, second, and third electronic devices 101, 102 and 103 can be implemented while being distributed into the first, second, and third electronic devices 101, 102 and 103, and the external electronic devices (e.g., the first external electronic device 902, the second external electronic device 904, or the server 906 of FIG. 9) according to roles, functions, and performances of the first, second, and third electronic devices 101, 102, and 103. For example, the processor 160 and/or the storage unit 150 of the first, second, and third electronic devices 101, 102, and 103 may be included in the first, second, and third electronic devices 101, 102, and 103, and the voltage adjustment unit 140 and/or the switch 130 may be included in the external electronic devices (e.g., the first external electronic device 902, the second external electronic device 904, or the server 906 of FIG. 9).

Various embodiments of the present disclosure are not limited thereto, and the first interface unit 110, the second interface unit 120, the switch 130, the voltage adjustment unit 140, the storage unit 150, the processor 160, the power management unit 170, and/or the determination unit 180 can be arranged on various areas of the first, second, and third electronic devices 101, 102, and 103.

Figure 3:
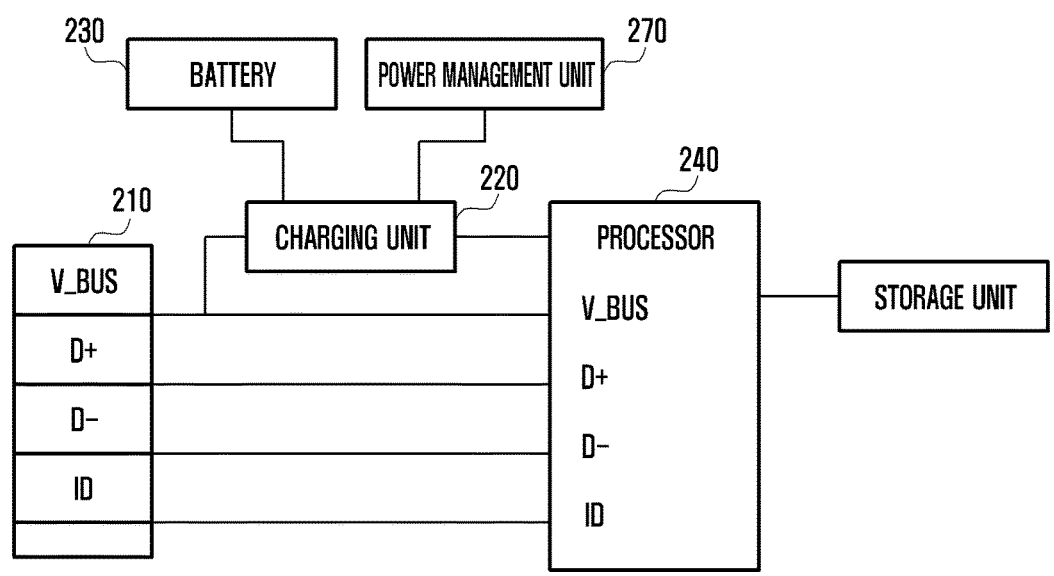
FIG. 3 is a block diagram illustrating an electronic device according to an embodiment of the present disclosure.

FIG. 3 is a block diagram illustrating a configuration of the first external electronic device 200 according to an embodiment of the present disclosure.

Referring to FIG. 3, the first external electronic device 200 according to an embodiment of the present disclosure may include an interface unit 210, a charging unit 220, a battery 230, a processor 240, a storage unit 250, and a power management unit 270.

The interface unit 210 may include an apparatus, such as, for example, a connector for functional connection with the electronic device 100. The interface unit 210 may support a USB interface standard. The interface unit 210 may include, for example, a power terminal V_BUS, a data communication terminal (e.g., D+ and D− or Rx+/− and Tx+/−), an identification terminal ID, and/or a ground terminal GND (not illustrated). The data communication terminal (e.g., D+ and D) can be collectively called, for example a first pin, the identification terminal ID can be called a second pin, and the power terminal V_BUS can be called a third pin.

The power terminal V_BUS may be connected to, for example, the charging unit 220 and the processor 240. The data communication terminals (e.g., D+ and D− or Rx+/− and Tx+/−) and the identification terminal ID may be connected to, for example, the processor 240.

The charging unit 220 can charge, for example, the battery. The charging unit 220 can, for example, operate in a charging mode or an On-The-Go (OTG) mode according to a control of the processor 240. In an embodiment, the charging unit 220 may further comprise a power path mode in addition to the charging mode and the OTG mode.

The charging mode is a mode in which the battery 230 is charged using power input from the outside. For example, the charging unit 220 according to an embodiment of the present disclosure can charge the battery 230 by receiving power from the the electronic device 100, where the electronic device 100 receives its power from the second external electronic device 300. In an embodiment, when operating in the charging mode, the charging unit 220 can supply to the battery 230 a part of power received from an external device (e.g., power from the second external electronic device 300 supplied through the electronic device 100) and supply the other part to the power management unit 270. The OTG mode is a mode in which power can be supplied to various external devices supporting USBs, such as a mouse, a keyboard, a USB memory, and an external hard disc. When the electronic device 100 is connected to the interface unit 210, the charging unit 220 according to an embodiment of the present disclosure can operate in the OTG mode and supply power of the battery 230 to the electronic device 100 through the power terminal V_BUS of the interface unit 210.

The power path mode is a mode in which power input from the outside is not supplied to (i.e. does not charge) the battery 230 but supplied to the power management unit 270. For example, the charging unit 220 according to an embodiment of the present disclosure can receive a part of power supplied by the second external electronic device 300 electrically connected to the electronic device 100, and supply the received power to the power management unit 270 without supplying power to the battery 230.

The battery 230 can, for example, supply power to each component of the first external electronic device 200. The battery 230 may be, for example, a rechargeable secondary battery. The battery 230 may be a battery electrically connected to the first external electronic device 200, an internal battery embedded in the first external electronic device 200, or a detachable battery detachable by a user. The battery 230 according to an embodiment of the present disclosure can be charged by part of the power from the second external electronic device 300.

The power management unit 270 may manage power supplied to the first external electronic device 200. The power management unit 270 can, for example, properly distribute and supply power of the battery 230 or power of the second external electronic device 300 supplied through the electronic device 100 to various components of the first external electronic device 200. The power management unit 270 may include, for example, a Power Management Integrated Circuit (PMIC).

The processor 240 may control overall operation of the first external electronic device 200 and communication among internal blocks of the first external electronic device 200, and perform data processing function for processing data. For example, the processor 240 may be a Central Processing Unit (CPU) or an Application Processor (AP). The processor 240 may be embodied as a single core processor or a multi-core processor. The processor 240 may also be configured as a plurality of processors.

The processor 240 according to an embodiment of the present disclosure can detect a connection to the electronic device 100 and recognize the type of the electronic device 100 through the identification terminal ID of the interface unit 210.

In an embodiment, the identification terminal ID may not be included in the first external electronic device 200. For example, although the identification terminal ID is illustrated in FIG. 3, the interface unit 210 may include, for example, a data communication terminal (e.g., D+ and D− or Rx+/− and Tx+/−), a power terminal V_BUS, and/or a ground terminal GND (not illustrated). The first external electronic device 200 can detect the connection to the electronic device 100 and recognize the type of the electronic device 100 through various widely-known schemes without using the identification terminal ID of the interface unit 210. For example, the first external electronic device 200 can detect the connection to the electronic device 100 and receive the type of the electronic device 100 through the data communication terminals (e.g., D+ and D−) of the interface unit 210.

When the connection of the electronic device 100 is detected, the processor 240 can control the charging unit 220 to operate in the OTG mode to supply the power of the battery 230 to the electronic device 100. For example, when the connection to the electronic device 100 is detected, the processor 240 can perform a USB enumeration procedure. The USB enumeration procedure is a procedure of recognizing a connected client apparatus and loading a driver for communicating with the corresponding apparatus. Since the USB enumeration procedure is obvious to those skilled in the art, detailed description will be omitted.

The processor 240 can determine whether state information is received from the electronic device 100 through the data communication terminals (e.g., D+ and D−) after the electronic device 100 is connected. The state information may be an event message notifying that the second external electronic device 300 is connected to the electronic device 100. For example, the processor 240 can receive a key value (e.g., 0x2fd or 0x2fe) notifying that the second external electronic device 300 is connected through the data communication terminals (e.g., D+ and D−) of the interface unit 210.

According to an embodiment, the state information may further include information on the type of the second external electronic device 300 connected to the electronic device 100. For example, the processor 240 can receive a key value (e.g., 0x3ff or 0x4ff) through the data communication terminals (e.g., D+ and D−) of the interface unit 210 regarding the type of the second external electronic device 300. The processor 240 can identify, through the received information, whether the second external electronic device 300 is, for example, a travel adaptor, a high-speed charger, an auxiliary battery, a notebook computer, or a desktop computer.

According to an embodiment, the state information may further include information on the charging current available to the first external electronic device 200. For example, the processor 240 can receive a key value (e.g., 0x05, etc.) for the charging current through the data communication terminals (e.g., D+ and D−) of the interface unit 210. The processor 240 can configure use of the charging current on the basis of the received information.

Accordingly, as described above, the first external electronic device 200 can receive the state information through the data communication terminal (e.g., D+ and D−) without additional components.

When the state information is received, the processor 240 may change the OTG mode of the charging unit 220 to the charging mode or the power path mode to terminate power supply to the electronic device 100.

The processor 240 can, for example, determine whether power from the electronic device 100 is interrupted (terminated). For example, the processor 240 may be able to determine whether the electronic device 100 and the second external electronic device 300 are disconnected from each other. For example, when a signal (high signal) having a predetermined magnitude or higher is not received at the power terminal V_BUS, i.e., when a signal lower than the predetermined magnitude is received, the processor 240 can determine that the electronic device 100 and the second external electronic device 300 are disconnected from each other. When the electronic device 100 and the second external electronic device 300 are disconnected from each other, the processor 240 can change the mode of the charging unit 220 from, for example, the charging mode or the power path mode to the OTG mode.

The storage unit 250 can store, for example, an Operating System (OS) of the first external electronic device 200 as well as application programs necessary for other optional functions such as an audio play function, an image or video display function, and the like. The storage unit 250 according to an embodiment of the present disclosure can store various kinds of information and programs necessary for controlling the adaptive power management method. For example, the program may include a routine for detecting the connection of the electronic device 100, a routine for terminating power supply to the electronic device 100 when receiving state information notifying of the the electronic device 100 being connected to the second external electronic device 300, a routine for changing the OTG mode of the charging unit 220 to the charging mode or the power path mode, and a routine for changing the charging mode or the power path mode of the charging unit 220 to the OTG mode when the power supply from the electronic device 100 is terminated.

The storage unit 250 according to an embodiment of the present disclosure can store a device class such as, for example, a USB Human Interface Device (HID) class. The USB HID class may have a structure as shown in FIG. 4 and may be implemented by software.

Figure 4:
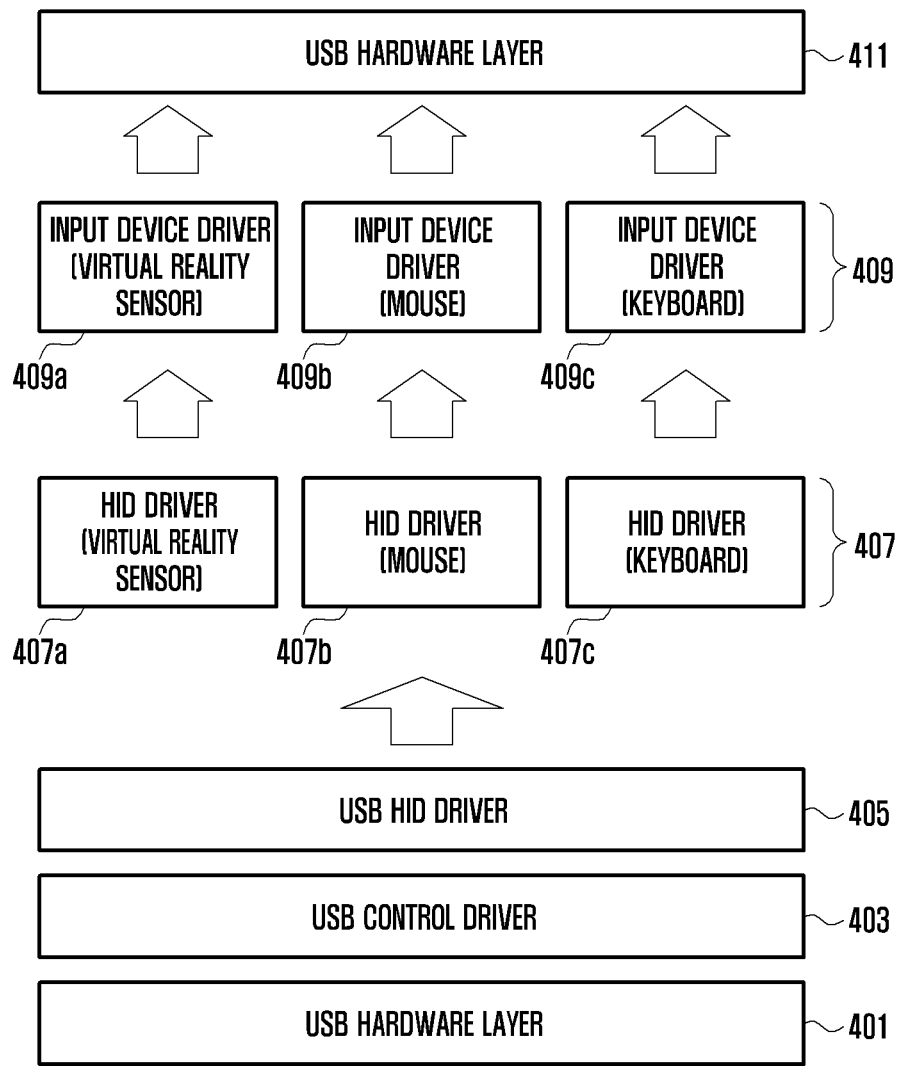
FIG. 4 illustrates an example of a device class according to an embodiment of the present disclosure.

FIG. 4 illustrates an example of a device class according to an embodiment of the present disclosure. Referring to FIG. 4, the structure of the USB HID class shown includes a USB hardware layer 401, a USB control driver 403, a USB HID driver 405, an HID driver 407, an input device driver 409, and an input reader framework 411.

A function/rule (e.g., arrangement of pins) for physical connection of USB devices (e.g., a keyboard, a mouse, a joystick, a scanner, a printer, and the like) can be defined in the USB hardware layer 401.

The USB control driver 403 may include, for example, information for driving the USB devices. The USB HID driver 405 may include, for example, information for driving the USB HID devices. Although an apparatus of an HID class is illustrated in the drawing as an embodiment, an apparatus of another USB class can be used.

The HID driver 407 may include, for example, a first HID driver 407a for a virtual reality sensor, a second HID driver 407b for a mouse, and/or a third HID driver 407c for a keyboard. The input device driver 409 may include, for example, a first input device driver 409a for a virtual reality sensor, a second input device driver 409b for a mouse, and/or a third input device driver 409c for a keyboard.

Although the HID driver 407 and the input device driver 409 support a plurality of (three) apparatuses of a USB HID class, since USB is a serial bus, only one apparatus of a USB class can transmit or receive state information at any given time. The input reader framework 411 can, for example, decipher a user input by analyzing signals transmitted from the input device driver 409. For example, when receiving a key value corresponding to a specific key (e.g., an enter key) of a keyboard from the third input device driver 409c, the input reader framework 411 can decipher the specific key (e.g., an enter key) corresponding to the received key value as a user input.

Since the structure of the USB HID class is obvious to those skilled in the art to which the present disclosure belongs, the detailed descriptions will be omitted.

The first external electronic device 200 according to an embodiment of the present disclosure can be connected to an HID such as, for example, a virtual reality sensor, a mouse, or a keyboard. A user can control the first external electronic device 200 through the HID.

The USB HID class according to an embodiment of the present disclosure can be loaded when connected to the electronic device 100. When the second external electronic device 300 is connected to the electronic device 100 after the USB HID class is loaded, the first external electronic device 200 can receive state information indicating connection of the second external electronic device 300 through the data communication terminals (e.g., D+ and D−) as one of a key value, a mouse coordinate value, or a virtual reality sensor value.

An embodiment of the present disclosure is not limited to receiving the state information using the USB HID class. Various USB class communications are possible. For example, the first external electronic device 200 can receive state information using an audio or video device class. According to an embodiment, the first external electronic device 200 can transmit audio or image data, which has been output to an audio module 1080 (FIG. 10) or a display module 1060 (FIG. 10), to the electronic device 100 through an Audio or Video (AV) device class. In various embodiments of the present disclosure, when the second external electronic device 300 is connected to the electronic device 100, the state information can be received through the connection of the audio or video device class. According to various embodiments, the interface unit 210 illustrated in the first external electronic device 200 may include terminal(s) other than the identification terminal ID, the data communication terminals (e.g., D+ and D−), the power terminal V_BUS, and/or the ground terminal GND (not illustrated), which are illustrated. For example, the first external electronic device 200 may include an interface (e.g., a communication interface) for communicating with another electronic device, and terminals included in the interface unit 210 can be changed according to the communication interface (e.g., the HDMI (the HDMI 1072 of FIG. 10), the optical interface (the optical interface 1076 of FIG. 10), the D-SUB (the D-SUB 1078 of FIG. 10), or the lighting terminal interface (not illustrated)).

According to various embodiments, although it is illustrated that all components of the first external electronic device 200 are included in one external electronic device, various embodiments are not limited thereto. For example, at least a part of components of the first external electronic device 200 can be implemented while being distributed into the first, second, and third electronic devices 101, 102 and 103, and the external electronic devices (e.g., the first external electronic device 902, the second external electronic device 904, or the server 906 of FIG. 9) according to roles, functions, or performances of the first external electronic device 200.

According to various embodiments, the electronic device (e.g., the electronic device 100) includes: a first interface (e.g., the first interface unit 110) for communicating with a first external electronic device (e.g., the first external electronic device 200) functionally connected to the electronic device; a second interface (e.g., the second interface unit 120) for receiving power supplied by a second external electronic device (e.g., the second external electronic device 300); and a processor (e.g. the processor 160) configured to: make a determination of whether the electronic device is electrically connected to the second external electronic device; generate state information corresponding to a result of the determination; and transmit the state information to the first external electronic device.

According to various embodiments, the first interface includes a first pin for communicating USB data, and the state information can be transmitted to the first external electronic device through the first pin.

According to various embodiments, the first interface further includes a second pin for identifying the first external electronic device, and the processor can be configured not to use the second pin when transmitting the state information to the first external electronic device.

According to various embodiments, the first interface further includes a third pin for communicating first power and second power with the third external electronic device, and the electronic device can be configured to receive the first power from the first external electronic device through the third pin and supply the second power to the first external electronic device through the third pin.

According to various embodiments, when receiving the first power from the first external electronic device is terminated based on transmitting the state information, the electronic device is configured to receive power from the second external electronic device through the second interface; and supply at least a part of the power as the second power to the first external electronic device.

According to various embodiments, the electronic device may further include a switch for connecting or interrupting a path between the first interface unit and the second interface unit; and a voltage adjustment unit for supplying third power to the electronic device using first power from the first external electronic device or the power from the second external electronic device.

According to various embodiments, the electronic device may further include a power management unit located between the switch and the first interface to distribute the power supplied by the second external electronic device as at least one of the third power for driving the electronic device and second power supplied to the first external electronic device.

According to various embodiments, the electronic device further comprises a determination unit for determining a type of the second external electronic device, wherein the processor can transmit information on an amount of a charging current available in the first external electronic device to the first external electronic device through the data communication terminals according to the determined type of the second external electronic device.

According to various embodiments, the second external electronic device may include one of a charging adaptor and an auxiliary battery for supplying power to the electronic device.

According to various embodiments, the first external electronic device includes a USB device class, and the state information may be a type of data corresponding to the USB device class.

According to various embodiments, the USB device class may include at least one of a keyboard, a mouse, a touch pad, a Virtual Reality (VR) sensor, and a device class for audio device, and video device, and the state information may include at least one of a corresponding types of a key value, a mouse coordinate value, a touch coordinate value, a VR sensor value, and an audio or video device control signal value.

According to various embodiments, an electronic device (e.g., the first external electronic device 200) includes: an interface (e.g., an interface unit 210) for communicating at least one of data, first power, and second power with a first external electronic device (e.g., the electronic device 100) functionally connected to the electronic device; and a processor (e.g., the processor 240) functionally connected to the interface, wherein the processor makes a configuration to is configured to acquire state information from the first external electronic device on whether the first external electronic device and a second external electronic device are connected to each other through the interface, and the electronic device is configured to receive the second power from the first external electronic device through the interface when the state information belongs to a first designated range; and supply the first power from a battery of the electronic device to the first external electronic device through the interface when the state information belongs to a second designated range.

According to various embodiments, the interface includes a first pin for communicating USB data, a second pin for identifying the first external electronic device, and a third pin for communicating the first power and the second power with the first external electronic device, wherein the state information can be acquired from the first external electronic device through the first pin.

According to various embodiments, the processor can perform USB enumeration when being functionally connected to the first external electronic device.

According to various embodiments, the electronic device may further include a charging unit for providing at least one function from among a charging function for charging the battery a power path function for supplying third power to the electronic device, and an OTG function for supplying the first power to the first external electronic device.

According to various embodiments, the charging unit can supply the first power from the battery to the first external electronic device through the third pin when the OTG function is activated.

According to various embodiments, the charging unit can activate the charging function based on the state information and use the second power supplied by the first external electronic device, thereby charging the battery.

According to various embodiments, the electronic device further includes a power management unit for managing the second power supplied to the electronic device, and the charging unit can activate the power path function based on the state information and supply the second power supplied by the first external electronic device to the power management unit.

According to various embodiments, the processor controls the charging unit to supply the first power to the first external electronic device through the third pin when interruption of power supplied by the third pin is detected in a state in which the first external electronic device is connected.

According to various embodiments, the electronic device is configured to receive the state information on a charging current according to a type of the second external electronic device through the first pin, and charge the battery based on the state information on the charging current.

According to various embodiments, the second external electronic device may include one of a charging adaptor and an auxiliary battery for supplying power to the electronic device.

According to various embodiments, the electronic device includes a USB device class, and the state information may be a type of data corresponding to the USB device class.

According to various embodiments, the USB device class may include at least one of a keyboard, a mouse, a touch pad, a Virtual Reality (VR) sensor, audio device, and video device, and the state information may include at least one of type of a key value, a mouse coordinate value, a touch coordinate value, a VR sensor value, and an audio or video device control signal value.

Figure 5:
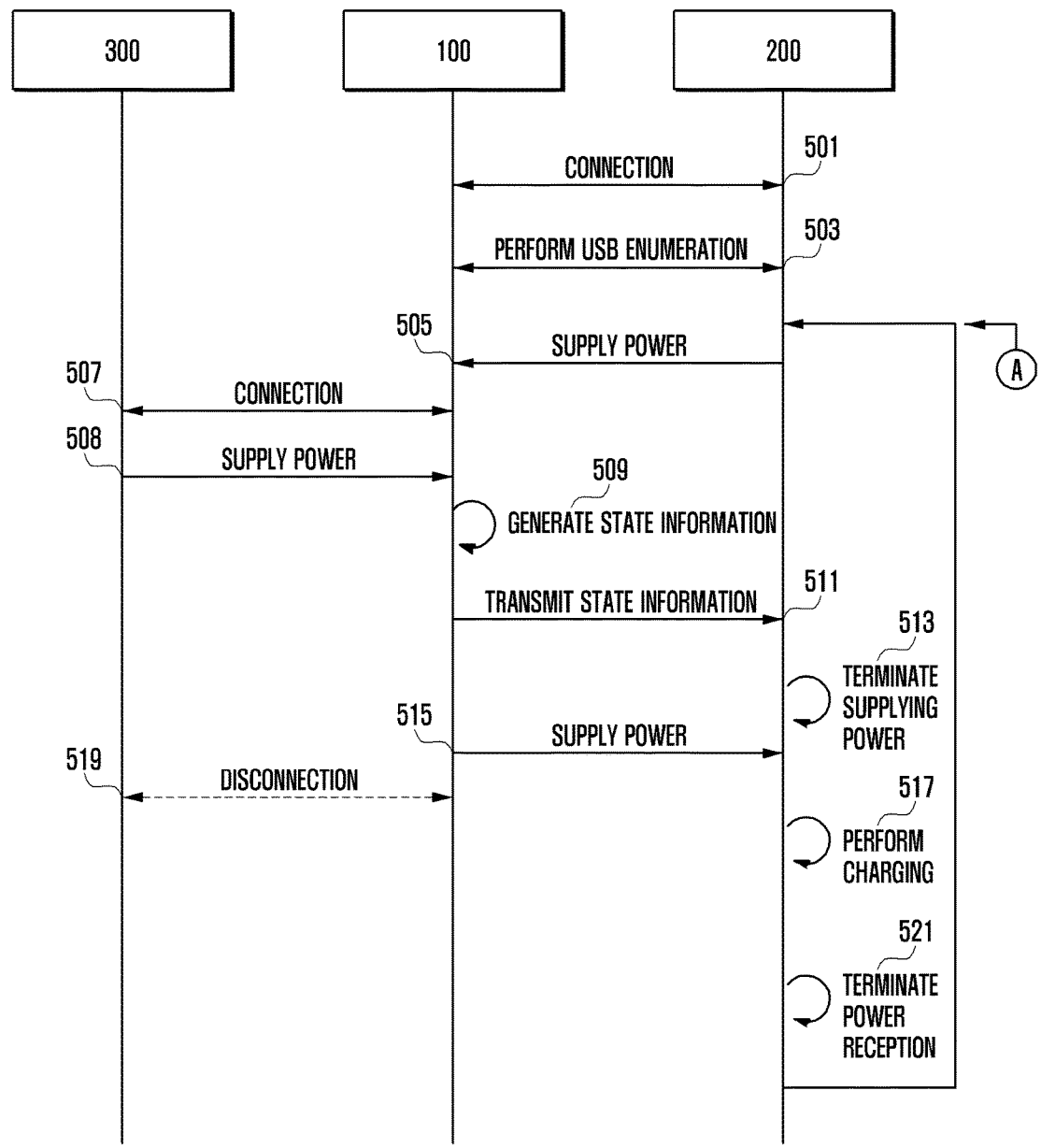
FIG. 5 is a signal flow diagram illustrating a method of adaptively managing power according to an embodiment of the present disclosure.

FIG. 5 is a signal flow diagram illustrating a method of adaptively managing power according to an embodiment of the present disclosure.

Referring to FIG. 5, the electronic device 100 may be functionally connected (connector-fastened) to the first external electronic device 200 in operation 501. The electronic device 100 can perform USB enumeration with the first external electronic device 200 in operation 503.

When the USB enumeration is completed, the first external electronic device 200 can, for example, supply power to the electronic device 100 in operation 505. The first external electronic device 200 can supply power to the electronic device 100 through an electric power terminal V_BUS of a USB interface. The first external electronic device 200 can activate the OTG function of the charging unit 220 to supply power from its battery 230 to the electronic device 100.

The electronic device 100 can be connected to the second external electronic device 300 in operation 507. The second external electronic device 300 can supply power to the electronic device 100, in operation 508. When the connection to the second external electronic device 300 is detected, the electronic device 100 can generate state information in operation 509. The electronic device 100 can transmit state information to the first external electronic device 200 in operation 511. The state information can be transmitted through the data communication terminals.

The first external electronic device 200 that has received the state information can, for example, terminate power supply to the electronic device 100 in operation 513. The electronic device 100 can supply to the first external electronic device 200 part of power supplied by the second external electronic device 300 in operation 515.

The first external electronic device 200 can, for example, charge the battery 230 using the power supplied by the electronic device 100 in operation 517. According to some embodiments, the first external electronic device 200 can select the power path mode to supply power to each component of the first external electronic device 200 without charging the battery 230. The electronic device 100 and the second external electronic device 300 may be disconnected from each other in operation 519. When the electronic device 100 and the second external electronic device 300 are disconnected from each other, the first external electronic device 200 may detect interruption of power reception in operation 521. This is because the electronic device 100 cannot supply power to the first external electronic device 200 any more. For example, when the power reception from the electronic device 100 is terminated, the first external electronic device 200 can return to operation 505 to activate the OTG function of the charging unit 220 so as to supply power to the electronic device 100.

Figure 6:
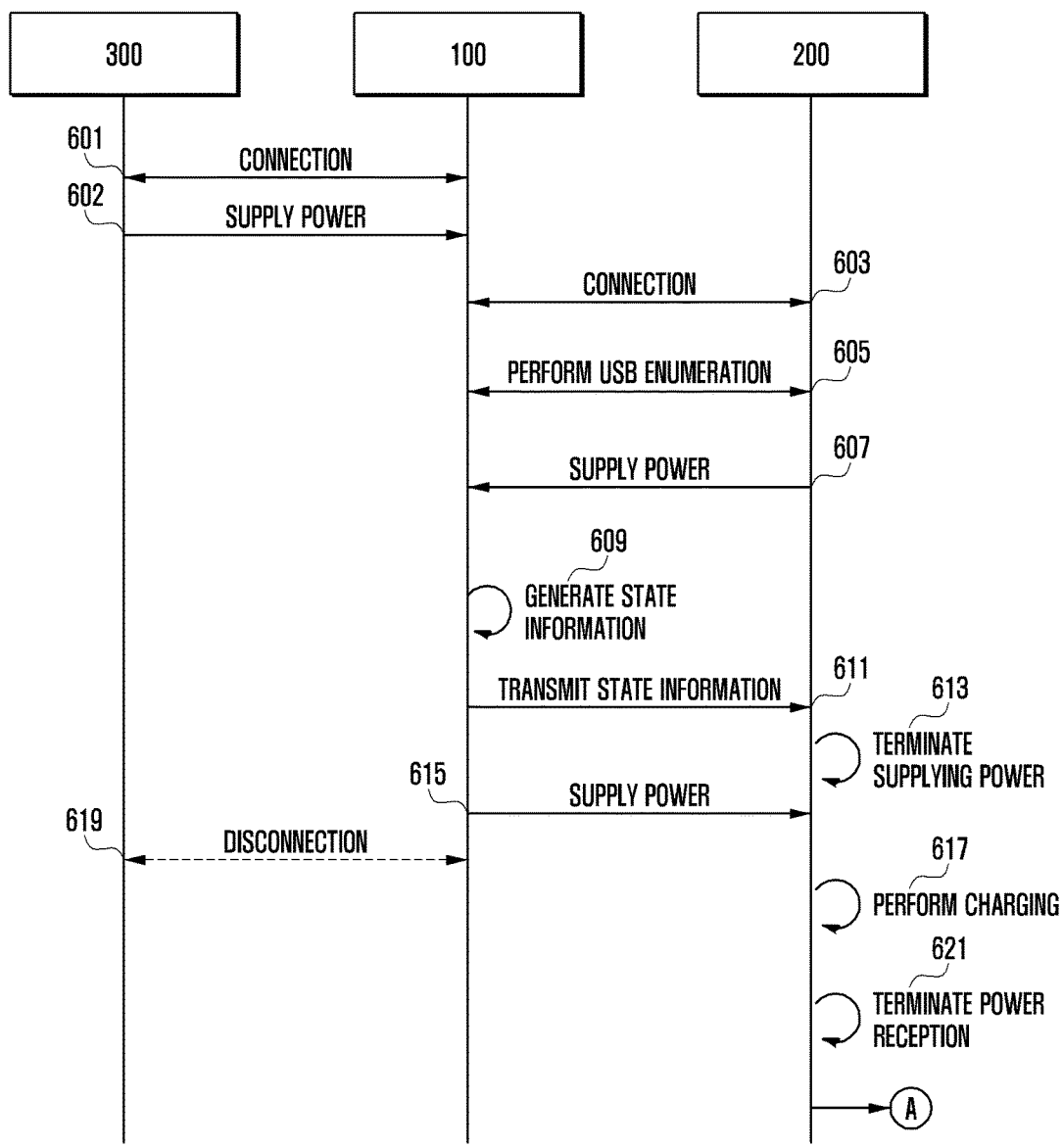
FIG. 6 is a signal flow diagram illustrating a method of adaptively managing power according to an embodiment of the present disclosure.

FIG. 6 is a signal flow diagram illustrating a method of adaptively managing power according to an embodiment of the present disclosure.

Referring to FIG. 6, the electronic device 100 and the second external electronic device 300 may be electrically connected to each other in operation 601. When connected to the electronic device 100, the second external electronic device 300 can, for example, supply power to the electronic device 100 in operation 602.

The electronic device 100 and the first external electronic device 200 may be functionally connected to each other in operation 603. The electronic device 100 may perform USB enumeration with the first external electronic device 200 in operation 605.

When the USB enumeration is completed, the first external electronic device 200 can, for example, supply power to the electronic device 100 in operation 607. For example, the first external electronic device 200 may operate in the OTG mode for the charging unit 220 to supply power from the battery 230 to the electronic device 100.

The electronic device 100 may generate state information in operation 609. The electronic device 100 may transmit the state information to the first external electronic device 200 in operation 611. The state information can be transmitted through the data communication terminals. The first external electronic device 200 that has received the state information can, for example, terminate power supply to the electronic device 100 in operation 613.

The electronic device 100 can, for example, supply to the first external electronic device 200 part of power supplied by the second external electronic device 300 in operation 615. The first external electronic device 200 may charge the battery 230 using the power supplied by the electronic device 100 in operation 617. According to some embodiments, the first external electronic device 200 may enter the power path mode that does not charge the battery 230. The electronic device 100 and the second external electronic device 300 may be disconnected from each other in operation 619. When the electronic device 100 and the second external electronic device 300 are disconnected from each other, the first external electronic device 200 may detect an interruption of power reception in operation 621. When power reception from the electronic device 100 is terminated, the first external electronic device 200 can proceed to operation 505 of FIG. 5 to supply power to the electronic device 100.

Figure 7A:
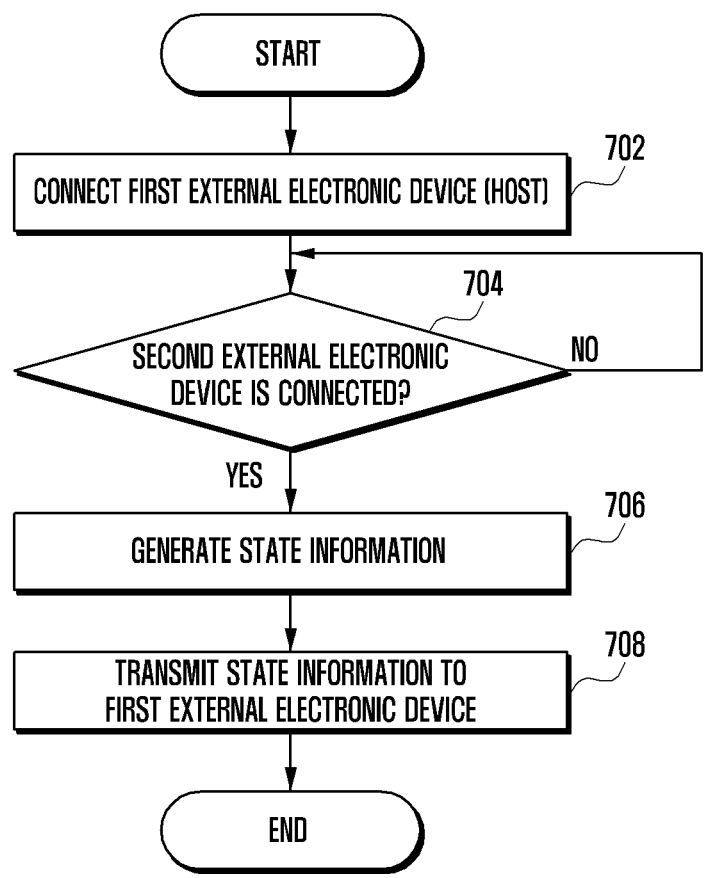
FIG. 7A is a flowchart illustrating a method of adaptively managing power of an electronic device operating as a client according to an embodiment of the present disclosure.

FIG. 7A is a flowchart illustrating a method of adaptively managing power of an electronic device operating as a client according to an embodiment of the present disclosure.

Referring to FIG. 7A, the processor 160 of the electronic device 100 according to an embodiment of the present disclosure may detect a connection to the first external electronic device 200 in operation 702. The first external electronic device 200 may be a device serving as a host.

In operation 704, the processor 160 may identify whether the second external electronic device 300 is connected. If the second external electronic device 300 is not connected, the processor 160 can repeatedly perform operation 704. If the second external electronic device 300 is connected, the processor 160 may generate state information in operation 706. The state information may be an event message notifying of the connection to the second external electronic device 300. For example, the state information may be a preconfigured key value. However, as described above, the state information is not limited to the key value and may be formed by various data types.

In operation 708, the processor 160 may transmit the state information to the first external electronic device 200. For example, the processor 160 can transmit the state information to the first external electronic device 200 through the data communication terminals (e.g., D+ and D− or Rx+/− and Tx+/−) of the first interface unit 110.

Figure 7B:
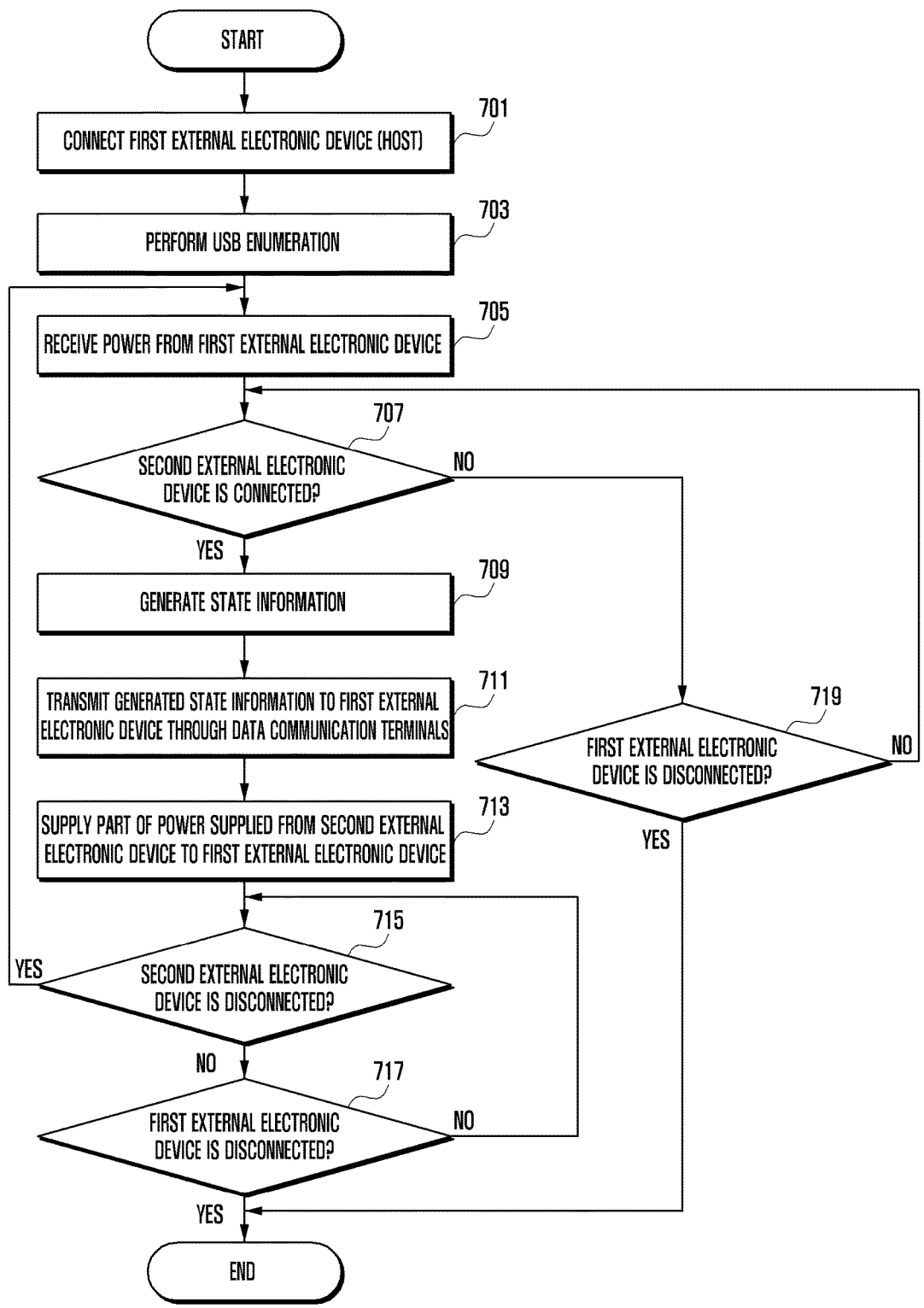
FIG. 7B is a flowchart illustrating a method of adaptively managing power of an electronic device operating as a client according to an embodiment of the present disclosure.

FIG. 7B is a flowchart illustrating a method of adaptively managing power of an electronic device operating as a client according to an embodiment of the present disclosure.

Referring to FIG. 7B, the processor 160 of the electronic device 100 according to an embodiment of the present disclosure may detect connection to the first external electronic device 200 in operation 701. The first external electronic device 200 may be a device serving as a host.

In operation 703, according to an embodiment, the processor 160 may perform USB enumeration. When the USB enumeration is completed, the processor 160 can, for example, receive power from the first external electronic device 200 in operation 705.

In operation 707, the processor 160 may identify whether the second external electronic device 300 is connected. For example, an interrupt may occur and the processor 160 may identify that the second external electronic device 300 is connected.

If the second external electronic device 300 is not connected, the processor 160 may determine whether the first external electronic device 200 is now disconnected in operation 719. If the first external electronic device 200 is not disconnected, the processor 160 can return to operation 707. If the first external electronic device 200 is disconnected, the processor 160 can terminate an adaptive power management procedure according to the present disclosure.

If it is detected in operation 707 that the second external electronic device 300 is connected, the processor 160 may generate state information in operation 709. The state information may be an event message notifying of the connection to the second external electronic device 300. For example, the state information may be a preconfigured key value. However, as described above, the state information is not limited to the key value and may be formed by various data types. In operation 711, the processor 160 may transmit the state information to the first external electronic device 200 through the data communication terminals. In operation 713, the processor 160 may supply to the first external electronic device 200 a part of power from the second external electronic device 300.

In operation 715, the processor 160 may determine whether the second external electronic device 300 is disconnected. For example, an interrupt may occur and the processor 160 may identify that the second external electronic device 300 is disconnected. If the second external electronic device 300 is disconnected, the processor 160 may return to operation 705 to repeatedly perform the above operations.

If the second external electronic device 300 is not disconnected, the processor 160 may determine whether the first external electronic device 200 is disconnected in operation 717. If the first external electronic device 200 is not disconnected, the processor 160 may return to operation 715. When the first external electronic device 200 is disconnected, the processor 160 can terminate an adaptive power management procedure according to an embodiment of the present disclosure.

Figure 8:
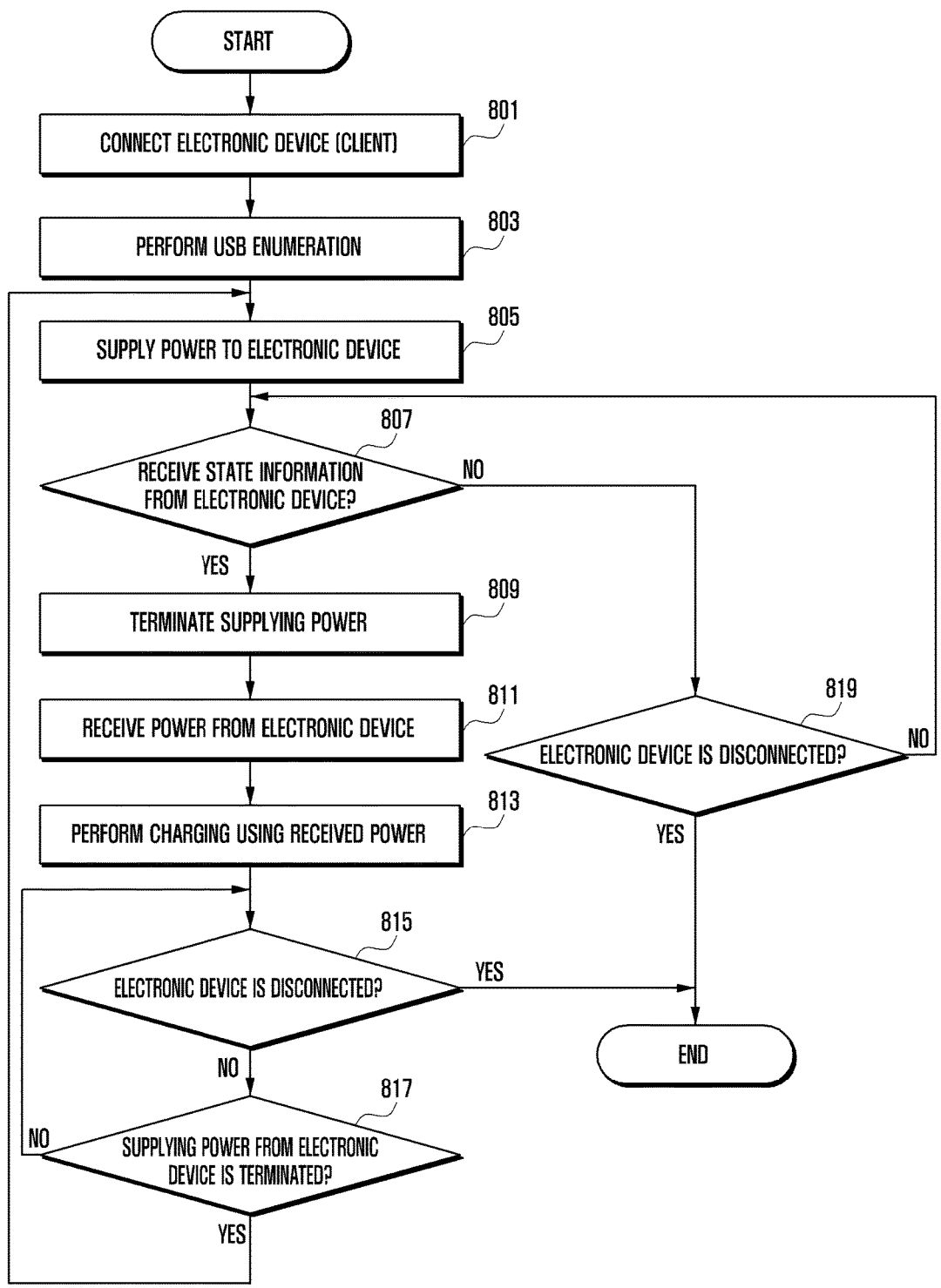
FIG. 8 is a flowchart illustrating a method of adaptively managing power of an external electronic device operating as a host according to an embodiment of the present disclosure.

FIG. 8 is a flowchart illustrating a method of adaptively managing power of an external electronic device operating as a host according to an embodiment of the present disclosure.

Referring to FIG. 8, in operation 801, the processor 240 of an external electronic device (e.g., the first external electronic device 200) may detect connection to the electronic device 100. The electronic device 100 may be a device serving as a client.

In operation 803, the processor 240 may perform USB enumeration. When the USB enumeration is completed, the processor 240 can, for example, supply power to the electronic device 100 in operation 805.

In operation 807, the processor 240 may determine whether state information is received from the electronic device 100. If the state information is not received, the processor 240 may identify whether the electronic device 100 is disconnected in operation 819. If the electronic device 100 is not disconnected, the processor 240 may return to operation 807. If the electronic device 100 is disconnected, the processor 240 can terminate an adaptive power management procedure according to the present disclosure.

Returning to operation 807, if the state information is received, i.e., if the connection to the second external electronic device 300 is detected, the processor 240 can terminate supplying power to the electronic device 100 in operation 809.

In operation 811, the processor 240 may receive power from the electronic device 100. In operation 813, the processor 240 can, for example, charge the battery 230 using the received power. In some embodiments, operation 813 may be omitted.

In operation 815, the processor 240 may determine whether the electronic device 100 is disconnected. If the electronic device 100 is disconnected, the processor 240 can terminate an adaptive power management procedure according to the present disclosure.

If the electronic device 100 is not disconnected, the processor 240 may determine whether supplying power by the electronic device 100 is terminated in operation 817. If supplying power by the electronic device 100 is not terminated, the processor 240 may return to operation 815. If supplying power by the electronic device 100 is terminated, the processor 240 may return to operation 805.

According to various embodiments, at least one of operations 801 to 819 may be omitted. For example, operation 813 may be omitted.

Operations described in the process illustrated in FIGS. 5 to 8 can be executed in a sequential, parallel, repeated, or heuristic method. For example, the operations may be executed in a different sequence, a part thereof may be omitted, or another operation may be added.

According to various embodiments, an adaptive power management method includes: determining whether an electronic device 100 is electrically connected to a first external electronic device (e.g., the second external electronic device 300); generating state information corresponding to a result of the determination; and transmitting the state information to a second external electronic device through a first pin for communicating USB data with the second external electronic device (e.g., the first external electronic device 200) functionally connected to the electronic device.

According to various embodiments, the transmitting may include making a configuration not to use a second pin for distinguishing the second external electronic device when transmitting the state information to the second external electronic device.

According to various embodiments, the method may further include receiving power from the second external electronic device through a third pin for communicating power with the second external electronic device or supplying power to the second external electronic device.

According to various embodiments, the method may further include receiving power supplied by the first external electronic device on the basis of connection to the first external electronic device when the power supply from the second external electronic device is terminated on the basis of the transmitting of the state information; and supplying at least a part of the power supplied by the first external electronic device to the second external electronic device through the third pin.

According to various embodiments, the method may further include: determining the type of the first external electronic device; and transmitting information on a charging current amount to the second external electronic device through the data communication terminals according to the determined type of the first external electronic device.

According to various embodiments, the first external electronic device may include a charging adaptor or an auxiliary battery for supplying power to at least one of the electronic device and the second external electronic device.

According to various embodiments, the second external electronic device includes a USB device class, and the state information may be the type of data corresponding to the USB device class.

According to various embodiments, the USB device class may include a keyboard, a mouse, a touch pad, a VR sensor, and a device class for audio device, video device, or combination thereof, and the state information may include types of a key value, a mouse coordinate value, a touch coordinate value, a VR sensor value, an audio or video device control signal value, or a combination thereof.

According to various embodiments, an adaptive power management method may include: acquiring state information on whether a first external electronic device (e.g., the electronic device 100) and a second external electronic device (e.g., the second external electronic device 300) are connected to each other through a first pin for communicating data, from the first external electronic device for an electronic device (e.g., the first external electronic device 200); receiving power from the first external electronic device through a second pin (e.g., the third pin) for communicating the power with the first external electronic device when the state information belongs to a first designated range; and supplying the power to the first external electronic device through the second pin when the state information belongs to a second designated range.

According to various embodiments, the method may further include performing USB enumeration when the electronic device is functionally connected to the first external electronic device.

According to various embodiments, the supplying of the power to the first external electronic device through the second pin may include activating an OTG function of a charging unit to supply power of a battery to the first external electronic device through the second pin.

According to various embodiments, the receiving of the power from the first external electronic device may include activating a charging function of the charging unit and charging the battery using power supplied through the first external electronic device.

According to various embodiments, the charging of the battery may include: receiving information on a charging current amount according to the type of the second external electronic device through the first pin; and charging the battery on the basis of the received information on the charging current amount.

According to various embodiments, the receiving of the power from the first external electronic device may include activating a power path function of the charging unit and supplying the power supplied through the first external electronic device to a power management unit for managing power supplied to the electronic device.

According to various embodiments, the method may further include controlling the charging unit to supply power to the first external electronic device through the second pin when interruption of power supplied by the second pin is detected in a state in which the first external electronic device is connected.

According to various embodiments, the second external electronic device may include a charging adaptor or an auxiliary battery for supplying power to at least one of the electronic device and the first external electronic device.

According to various embodiments, the electronic device includes a USB device class, and the state information may be a type of data corresponding to the USB device class.

According to various embodiments, the USB device class may include a keyboard, a mouse, a touch pad, a VR sensor, and a device class for audio device, video device, or a combination thereof, and the state information may include types of a key value, a mouse coordinate value, a touch coordinate value, a VR sensor value, an audio or video device control signal value, or a combination thereof.

Figure 9:
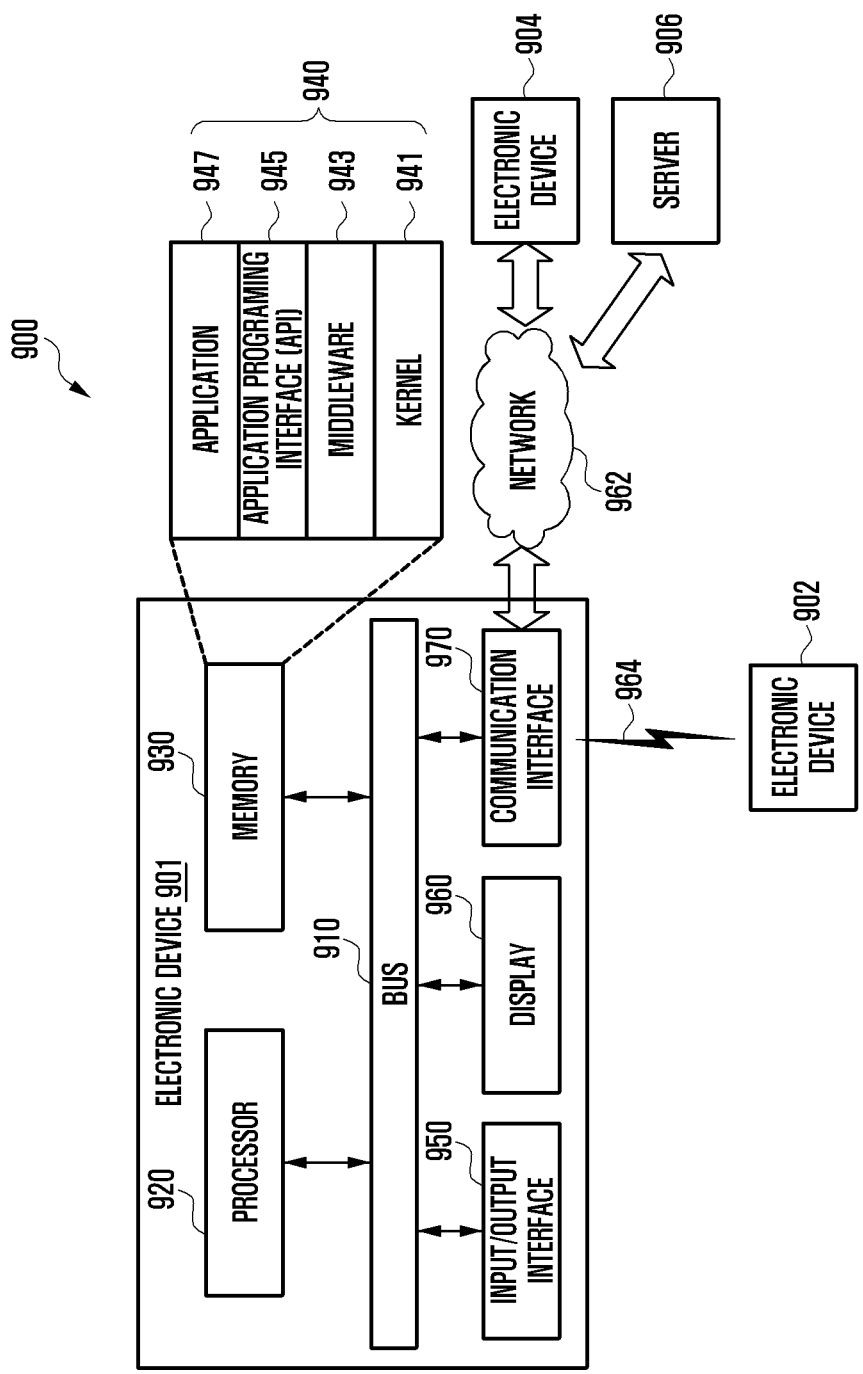
FIG. 9 illustrates a network environment including an electronic device according to various embodiments of the present disclosure.

FIG. 9 illustrates a network environment 900 including an electronic device 901 according to various embodiments of the present disclosure.

Referring to FIG. 9, an electronic device 901 in a network environment 900 is disclosed. The electronic device 901 includes a bus 910, a processor 920, a memory 930, an input/output interface 950, a display 960, and a communication interface 970. According to some embodiments, the electronic device 901 may omit at least one of the components or further include other component(s).

The bus 910 may connect the above described components and transmit communication (for example, control messages or data) among the above described components of the electronic device 901.

The processor 920 may include one or more of central processing unit (CPU), application processor (AP) or communication processor (CP). For example, the processor 920 may control at least one component of the electronic device 901 and/or execute instructions relating to communication or data processing.

The memory 930 may include volatile and/or non-volatile memory. For example, the memory 930 may store command and/or data relating to at least one component of the electronic device 901. According to one embodiment, the memory 930 may store software and/or program 940. For example, the program 940 may include a kernel 941, middleware 943, an Application Programming Interface (API) 945, and/or an application 947 (e.g., application program) and so on. At least one portion of the kernel 941, the middleware 943 and the API 945 may be defined as an operating system (OS).

The kernel 941 controls or manages system resources (for example, the bus 910, the processor 920, and/or the memory 930) used for executing an operation or function implemented by, for example, the middleware 943, the API 945, and/or the application 947. Furthermore, the kernel 941 provides an interface for accessing individual components of the electronic device 901 from the middleware 943, the API 945, or the application 947 to control or manage the components.

The middleware 943 performs a relay function of allowing the API 945 or the application 947 to communicate with the kernel 941 to exchange data. Furthermore, in operation requests received from the application 947, the middleware 943 controls the operation requests based on priority. For example, the middleware 943 assigns a priority to at least one of application 947 for using the system resources (e.g., bus 910, processor 920, memory 930 and the like) of the electronic device 901, and may process at least one operation request.

The API 945 is an interface by which the application 947 can control a function provided by the kernel 941 or the middleware 943 and includes, for example, at least one interface or function (for example, commands) for file control, window control, image processing, or character control.

The input/output interface 950 may be an interface to transmit command or data inputted by a user or another external device to another component(s) of the electronic device 901. Furthermore, the input/output interface 950 may output the command or data received from another component(s) of the electronic device 901 to the user or another external device.

The display 960 may include, for example, LCD (Liquid Crystal Display), LED (Light Emitting Diode), OLED (Organic Light Emitting Diode), or MEMS display (micro electro mechanical system), or electronic paper display. The display 960 may display various contents (text, image, video, icon, or symbol, and so on) to a user. The display 960 may include a touch screen, and receive touch, gesture, approaching, or hovering input using an electronic pen or a part of body of the user.

The communication interface 970 may allow communication between the electronic device 901 and an external device (for example a first external electronic device 902, a second external electronic device 904, or a server 906). For example, the communication interface 970 may communicate with the external device through the network 962 using wireless communication or wired communication.

Wireless communication may include cellular communication using at least one of, for example, LTE (long term evolution), LTE-A (LTE Advance), CDMA (code division multiple access), WCDMA (wideband CDMA), UMTS (universal mobile telecommunications system), WiBro (Wireless Broadband) or GSM (Global System for Mobile Communications), and the like. According to one embodiment, wireless communication may include at least one of Wi-Fi, Bluetooth, BLE, ZigBee, Near Field Communication (NFC), Magnetic Secure Transmission, Radio Frequency (RF), or Body Area Network (BAN). According to one embodiment, the wireless communication can include Global Navigation Satellite System (GNSS). The GNSS, for example, can be GPS (Global Positioning System), Glonass (Global Navigation Satellite System), Beidou Navigation Satellite System (hereinafter "Beidou") or Galileo, the European global satellite-based navigation system. Hereinafter, GPS and GNSS are used interchangeably. Wired communication may include at least one of, for example, a Universal Serial Bus (USB), a High Definition Multimedia Interface (HDMI), Recommended Standard 232 (RS-232), powerline communication, and a Plain Old Telephone Service (POTS), and the like. The network 962 can include telecommunication network such as, for example, computer network (e.g., LAN or WAN), internet, or telephone network.

Each of the first external electronic device 902 and the second external device 904 may be same type or different type of device as the electronic device 901. According to various embodiments, at least some portion of functions executed by the electronic device 901 may be performed by one or more electronic devices (for example, the first and second external electronic devices 902 and 904, or server 906). According to some embodiments, when the electronic device 901 needs to perform a function or service automatically, the electronic device 901 may request another device (for, example, the first and second external electronic devices 902 and 904, or server 906) to perform at least part of the function instead of or in addition to executing the function or service by the electronic device 901. The other electronic device (for example, the first and second external electronic devices 902 and 904, or server 906) may execute the requested function or additional function and transmit the result to the electronic device 901. The electronic device 901 may use the received result to provide the requested function or service. Cloud computing, distributed computing, or client-server computing technique may be used.

FIG. 10 illustrates a block diagram of an electronic device 1001. The electronic device 1001 may comprise, for example, a whole or a part of the electronic device 901 illustrated in FIG. 9. The electronic device 1001 may include an Application Processor (AP) 1010, which may be one or more processors, a communication module 1020, a Subscriber Identification Module (SIM) card 1024, memory 1030, a sensor module 1040, an input device 1050, a display module 1060, an interface 1070, an audio module 1080, a camera module 1091, a power management module 1095, a battery 1096, an indicator 1097, and a motor 1098.

The AP 1010 executes an operating system (OS) and/or application programs to control a plurality of hardware and/or software elements connected to the AP 1010 and perform various data processing and calculations including multimedia data. The AP 1010 may be implemented by, for example, a System on Chip (SoC). According to an embodiment, the AP 1010 may further include a Graphic Processing Unit (GPU) and/or image signal processor. The AP 1010 may include at least one portion of other components illustrated in FIG. 10 (for example, cellular module 1021). The AP 1010 may load command or data received from at least one of another component (for example, memory 1030), store various data in memory 1030. The memory 1030 may comprise, for example, non-volatile memory.

The communication module 1020 may include same or similar components as the communication interface 970. The communication module 1020 may include, for example, cellular module 1021, a Wi-Fi module 1023, a Bluetooth (BT) module 1025, a GPS module 1027, a Near Field Communication (NFC) module 1028, and a Radio Frequency (RF) module 1029.

The cellular module 1021 may support voice call, video call, Short Message Service (SMS), and/or Internet service through a communication network. According to an embodiment, the cellular module 1021 may distinguish and authenticate electronic devices within a communication network by using a subscriber identification module (for example, the SIM card 1024). According to an embodiment, the cellular module 1021 performs at least some of the functions that can be provided by the AP 1010. According to an embodiment, the cellular module 1021 may include a Communication Processor (not shown).

According to an embodiment, at least some of the cellular module 1021, the Wi-Fi module 1023, the BT module 1025, the GPS module 1027, and the NFC module 1028 may be included in one integrated chip (IC) or IC package.

The RF module 1029 transmits/receives RF signals. The RF module 1029 may include, for example, a transceiver, a Power Amp Module (PAM), a frequency filter, a Low Noise Amplifier (LNA), antenna, or the like. According to an embodiment, at least one of the cellular module 1021, the Wi-Fi module 1023, the BT module 1025, the GPS module 1027, and the NFC module 1028 may transmit/receive RF signals through a separate RF module. The SIM card 1024 is a card including a Subscriber Identification Module and includes unique identification information (for example, Integrated Circuit Card Identifier (ICCID)) or subscriber information (for example, International Mobile Subscriber Identity (IMSI)).

The memory 1030 may include an internal memory 1032 and/or an external memory 1034. The internal memory 1032 may include, for example, at least one of volatile memory (for example, dynamic RAM (DRAM), static RAM (SRAM), synchronous dynamic RAM (SDRAM), and the like), and non-volatile Memory (for example, one-time programmable ROM (OTPROM), programmable ROM (PROM), erasable and programmable ROM (EPROM), electrically erasable and programmable ROM (EEPROM), mask ROM, flash ROM, flash memory, hard drive, or solid state drive (SDD)). The external memory 1034 may further include a flash drive of a type such as, for example, Compact Flash (CF), Secure Digital (SD), Micro Secure Digital (Micro-SD), Mini Secure Digital (Mini-SD), extreme Digital (xD), or memory stick. The external memory 1034 may be functionally or physically connected to the electronic device 1001 through various interfaces.

The sensor module 1040 measures a physical quantity or detects an operation state of the electronic device 1001, and converts the measured or detected information to an electronic signal. The sensor module 1040 may include, for example, at least one of a gesture sensor 1040A, a gyro sensor 1040B, an atmospheric pressure (barometric) sensor 1040C, a magnetic sensor 1040D, an acceleration sensor 1040E, a grip sensor 1040F, a proximity sensor 1040G, a color sensor 1040H (for example, Red, Green, and Blue (RGB) sensor), a biometric sensor 1040I, a temperature/humidity sensor 1040J, an illumination (light) sensor 1040K, and an Ultra Violet (UV) sensor 1040M. Additionally or alternatively, the sensor module 1040 may include, for example, an E-nose sensor, an electromyography (EMG) sensor, an electroencephalogram (EEG) sensor, an electrocardiogram (ECG) sensor, an InfraRed (IR) sensor, an iris sensor, a fingerprint sensor and the like. The sensor module 1040 may further include a control circuit for controlling one or more sensors included in the sensor module 1040.

According to an embodiment, the electronic device 1001 includes a processor, which may be configured to as part of or separately from the AP 1010, for controlling the sensor module 1040 while the AP 1010 is in sleep state.

The input device 1050 includes a touch panel 1052, a (digital) pen sensor 1054, a key 1056, and an ultrasonic input device 1058. For example, the touch panel 1052 may recognize a touch input in at least one type of a capacitive type, a resistive type, an infrared type, and an acoustic wave type. The touch panel 1052 may further include a control circuit. The touch panel 1052 may further include a tactile layer. In this event, the touch panel 1052 may provide a tactile reaction to the user.

The (digital) pen sensor 1054, for example, may be part of the touch panel 1052, or include a separate recognition sheet. The key 1056 may include, for example, a physical button, an optical key, or a key pad. The ultrasonic input device 1058 is a device that can detect an acoustic wave generated by an input device by a microphone (for example, microphone 1088) and identify data corresponding to the detected acoustic wave.

The display module 1060 may include a panel 1062, a hologram device 1064, a projector 1066, and/or a control circuit to control the panel 1062, the hologram device 1064, and the projector 1066. The panel 1062 may be implemented to be, for example, flexible, transparent, or wearable. The panel 1062 may be configured as the touch panel 1052 and one module. The hologram device 1064 may show a stereoscopic image in the air by using interference of light. The projector 1066 may project light on a screen to display an image. For example, the screen may be located on the electronic device 1001 or outside the electronic device 1001. The interface 1070 may include, for example, a High Definition Multimedia Interface (HDMI) 1072, a Universal Serial Bus (USB) 1074, an optical interface 1076, and a D-subminiature (D-sub) 1078. The interface 1070 may be included in, for example, the communication interface 970 illustrated in FIG. 9. Additionally or alternatively, the interface 1070 may include, for example, a Mobile High-definition Link (MHL) interface, a Secure Digital (SD) card/Multi-Media Card (MMC), or an Infrared Data Association (IrDA) standard interface.

The audio module 1080 converts sound to electronic signals, and vice versa. At least some components of the audio module 1080 may be included in, for example, the input/output interface 950 illustrated in FIG. 9. The audio module 1080 processes sound information input or output through, for example, the speaker 1082, the receiver 1084, the earphone 1086, the microphone 1088 or the like.

The camera module 1091 is a device that can photograph still images and/or videos. According to an embodiment, the camera module 1091 may include one or more image sensors (for example, a front sensor or a back sensor), a lens, an Image Signal Processor (ISP) or a flash (for example, an LED or xenon lamp).

The power managing module 1095 manages power for the electronic device 1001. According to an embodiment, the power managing module 1095 may include, for example, a Power Management Integrated Circuit (PMIC), a charger Integrated Circuit (IC), a battery and/or a battery gauge.

The PMIC may support wired and wireless charging methods. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added. The battery gauge measures, for example, a remaining quantity of charge in the battery 1096, voltage, current, or temperature during charging the battery 1096. The battery 1096 may include a rechargeable battery and/or a solar battery.

The indicator 1097 shows particular statuses of the electronic device 1001 or a part (for example, AP 1010) of the electronic device 1001. The statuses may include, for example, booting status, message status, charging status and the like. The motor 1098 converts an electrical signal to generate vibrations and haptic effects. The electronic device 1001 may include a processing unit (for example, a GPU) for supporting mobile TV. The processing unit for supporting mobile TV may process, for example, media data according to Digital Multimedia Broadcasting (DMB) standard, Digital Video Broadcasting (DVB) standard, media flow standard or the like.

Each of the components of the electronic device 1001 according to various embodiments of the present disclosure may be implemented by one or more components and the name of the corresponding component may vary depending on a type of the electronic device. The electronic device 1001 according to various embodiments of the present disclosure may include at least one of the above described components, although a few of the components may be omitted, or additional components may be further included. Also, some of the components of the electronic device according to various embodiments of the present disclosure may be combined to form a single component, and thus may equivalently execute functions of the corresponding components before being combined.

Figure 11:
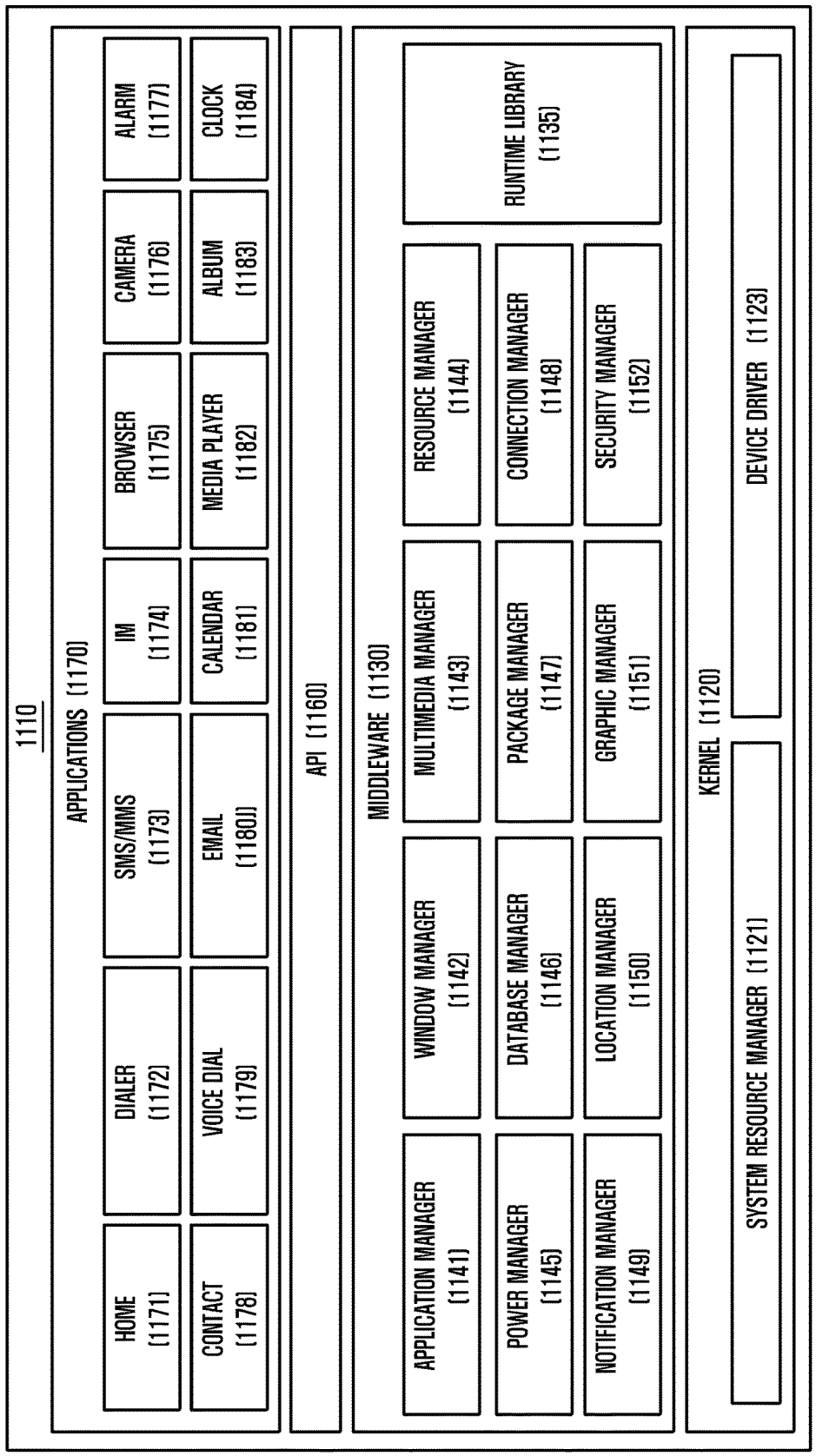
FIG. 11 is a block diagram illustrating a program module according to various embodiments.

FIG. 11 is a block diagram illustrating a programming module 1110 according to an embodiment of the present disclosure. According to an embodiment, the programming module 1110 may include an OS for controlling resources related to an electronic device and/or various applications 1170 driven on the OS. For example, the OS may be Android™, iOS™, Windows™, Symbian™, Tizen™, Bada™, or the like. Referring to FIG. 11, the programming module 1110 may include a kernel 1120, middleware 1130, an API 1160, and/or the applications 1170. At least a portion of the programming module 1110 may be preloaded on the electronic device or is downloadable from an external electronic device (e.g., the first and second external electronic devices 902 and 904, server 906).

The kernel 1120, for example, may include a system resource manager 1121 and/or a device driver 1123. The system resource manager 1121 can control, allocate, and/or collect system resources. According to an embodiment, the system resource manager 1121 may include, for example, a process manager, a memory manager, and a file system manager. The device driver 1123 may include, for example, a display driver, a camera driver, a Bluetooth driver, a shared memory driver, a USB driver, a keypad driver, a Wi-Fi driver, an audio driver or an Inter-Process Communication (IPC) driver.

The middleware 1130 may include a plurality of modules implemented to provide functions commonly used by the applications 1170. Furthermore, the middleware 1130 can provide the functions through the API 1160 such that the applications 1170 can efficiently use restricted system resources within the electronic apparatus. According to an embodiment, the middleware 1130 may include at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The runtime library 1135 may include a library module that a compiler uses in order to add a new function through a programming language while one of the applications 1170 is being executed. The runtime library 1135 may perform an input/output, memory management, and/or a function for an arithmetic function.

The application manager 1141 may manage a life cycle of at least one of the applications 1170. The window manager 1142 can manage Graphical User Interface (GUI) resources used by a screen. The multimedia manager 1143 may detect formats used for reproduction of various media files, and may perform encoding and/or decoding of a media file by using a codec suitable for the corresponding format. The resource manager 1144 can manage resources such as a source code, a memory, and a storage space of at least one of the applications 1170. The power manager 1145 can manage a battery and/or power, and provide power information required for the operations of the electronic device. According to an embodiment, the power manager 1145 can operate together with a Basic Input/Output System (BIOS). The database manager 1146 can manage generation, search, and/or change of a database to be used by at least one of the applications 1170. The package manager 1147 can manage installation and/or an update of an application distributed in a form of a package file.

The connectivity manager 1148 can manage wireless connectivity. The notification manager 1149 can display and/or notify of an event, such as an arrival message, an appointment, a proximity notification, and the like. The location manager 1150 can manage location information of an electronic apparatus. The graphic manager 1151 can manage a graphic effect which will be provided to a user, and/or a user interface related to the graphic effect. The security manager 1152 can provide all security functions used for system security and/or user authentication.

According to an embodiment, when an electronic apparatus has a telephone call function, the middleware 1130 may further include a telephony manager for managing voice and/or video communication function of the electronic apparatus. According to an embodiment, the middleware 1130 can provide modules specialized according to types of OSs in order to provide differentiated functions. Furthermore, the middleware 1130 may dynamically remove some of the existing elements and/or add new elements.

The API 1160 is a set of API programming functions, and may be different depending on the OS. For example, in a case of Android or iOS, one API set may be provided for each of platforms, and in a case of Tizen, two or more API sets may be provided.

The applications 1170 may include a home application 1171, a dialer application 1172, a Short Messaging Service (SMS)/Multimedia Messaging Service (MMS) application 1173, an Instant Messaging (IM) application 1174, a browser application 1175, a camera application 1176, an alarm application 1177, a contact application 1178, a voice dial application 1179, an email application 1180, a calendar application 1181, a media player application 1182, an album application 1183, and a clock application 1184. There may be other applications not shown such as, for example, health care application (e.g., measure exercise amount or blood sugar), or environment information application (e.g., atmospheric pressure, humidity, temperature information).

According to an embodiment, the application 1170 can include an information exchange application that supports information exchange between the electronic device and an external electronic device. The information exchange application, for example, can include a notification relay application that transmits specific information to the external electronic device or a device management application that manages the external electronic device. For example, the notification transmission application can transmit notification information generated in the electronic device to the external electronic device or can receive notification information from the external electronic device and provide the information to the user. The device management application, for example, can turn-on/turn-off the functions (e.g., the external electronic device (or a portion of the components)) of the external electronic device communicating with the electronic device, adjust the brightness of the display, or install, delete, or update applications running in the external electronic device. According to an embodiment, the application 1170 can include a designated application (e.g., health management application of a mobile medical device) based on the attribute of the external electronic device. According to an embodiment, the application 1170 can include an application received from the external electronic device.

At least a part of the programming module 1110 can be implemented as software, firmware, hardware (e.g., AP 1010) or a combination of at least two of software, firmware, and hardware and may include, for example, a module, a program, a routine, a set of instructions and/or a process for performing at least one function.

The term "module" used in the present disclosure may refer to, for example, a unit including at least one of hardware, software, and firmware. The "module" may be interchangeably used with a term, such as unit, logic, logical block, component, and/or circuit. A "module" may be at least a minimum unit of an integrally configured article. A "module" may be a minimum unit performing at least one function. A "module" may be mechanically and/or electronically implemented. For example, an electronic "module" according to the present disclosure may include at least one of an Application-Specific IC (ASIC) chip, a Field-Programmable Gate Arrays (FPGA), and a programmable-logic device for performing operations which has been known and/or are to be developed hereinafter.

According to various embodiments, at least some of the devices (for example, modules or functions thereof) or the operations according to the present disclosure may be implemented by commands stored in a computer-readable storage medium in a programming module form. When the instructions are executed by at least one processor (e.g., the processor 920), the processor may perform functions corresponding to the instructions. The computer-readable storage medium may be, for example, the memory 930.

The computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices configured to store and execute program commands, such as a read only memory (ROM), a random access memory (RAM), and a flash memory. In addition, the program instructions may be in a high level language that can be executed by a processor/computer using an interpreter, as well as machine codes. Some or all of the hardware devices described above may be configured to work as one or more software modules in order to perform the operations according to various embodiments of the present disclosure, and vice versa.

According to various embodiments, a storing medium for storing commands is provided. The commands are configured to perform at least one operation by at least one processor when being executed by the at least one processor. The at least one operation may include: determining whether an electronic device and a first external electronic device are electrically connected to each other; generating state information corresponding to a result of the determination; and transmitting the state information to a second external electronic device through a first pin for communicating USB data with the second external electronic device functionally connected to the electronic device.

According to various embodiments, a recording medium for commands is provided. The commands are configured to perform at least one operation by at least one processor when being executed by the at least one processor. The at least one operation may include: acquiring state information relating to whether a first external electronic device and a second external electronic device are connected to each other, through a first pin for communicating USB data, from the first external electronic device for an electronic device; receiving first power from the first external electronic device through a second pin for communicating the power with the first external electronic device when the state information belongs to a first designated range; and supplying second power to the first external electronic device through the second pin when the state information belongs to a second designated range.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Furthermore, some operations may be executed according to another order or may be omitted, or other operations may be added.

The various embodiments of the present disclosure disclosed in the present specification and the drawings have been presented to help comprehension of the present disclosure, and are not intended to limit the scope of various embodiments of the present disclosure. Therefore, it should be construed that, in addition to the embodiments disclosed herein, all modifications and changes or modified and changed forms derived from the technical idea of various embodiments of the present disclosure fall within the scope of the present disclosure.

What is claimed is:

1. An electronic device comprising:
    a first interface for communicating with a first external electronic device functionally connected to the electronic device;
    a second interface for receiving power supplied by a second external electronic device; and
    a processor configured to:
        receive power from the first external electronic device electrically connected to the electronic device through the first interface;
        determine whether the second external electronic device is electrically connected to the electronic device through the second interface;
        generate state information if the second external electronic device is connected to the electronic device;
        transmit the state information to the first external electronic device through the first interface;

receive power from the second external electronic device through the second interface when the power reception from the first external electronic device is stopped in response to the transmission of the state information; and supply at least a part of the power to the first external electronic device through the first interface.

2. The electronic device of claim 1, wherein the first interface comprises a first pin for communicating Universal Serial Bus (USB) data, and the state information is transmitted to the first external electronic device through the first pin.

3. The electronic device of claim 2, wherein the first interface further comprises a second pin for distinguishing the first external electronic device, and the processor is configured not to use the second pin when transmitting the state information to the first external electronic device.

4. The electronic device of claim 2, wherein the first interface further comprises a third pin for communicating first power and second power with the first external electronic device, and the electronic device is configured to receive the first power from the first external electronic device through the third pin and supply the second power to the first external electronic device through the third pin.

5. The electronic device of claim 4, wherein
the processor is configured to supply at least a part of the power received from the second external electronic device as the second power to the first external electronic device through the third pin.

6. The electronic device of claim 1, further comprising:
a switch for connecting or interrupting a path between the first interface and the second interface; and
a voltage adjustment unit for supplying third power to the electronic device using first power from the first external electronic device or the power from the second external electronic device.

7. The electronic device of claim 6, further comprising a power management unit located between the switch and the first interface to distribute the power supplied by the second external electronic device as at least one of the third power for driving the electronic device and second power supplied to the first external electronic device.

8. The electronic device of claim 1, further comprising a determination unit for determining a type of the second external electronic device, wherein the processor transmits information on an amount of a charging current available in the first external electronic device to the first external electronic device through data communication terminals according to the type of the second external electronic device.

9. The electronic device of claim 1, wherein the second external electronic device comprises one of a charging adaptor and an auxiliary battery for supplying power to the electronic device.

10. The electronic device of claim 1, wherein the first external electronic device comprises a USB device class, and the state information is a type of data corresponding to the USB device class.

11. The electronic device of claim 10, wherein the USB device class comprises at least one of a keyboard, a mouse, a touch pad, a Virtual Reality (VR) sensor, an audio device, and a video device, and
the state information comprises at least one of a corresponding type of a key value, a mouse coordinate value, a touch coordinate value, a VR sensor value, and an audio or video device control signal value.

12. An electronic device comprising:
an interface for communicating at least one of data, first power, and second power with a first external electronic device functionally connected to the electronic device; and
a processor functionally connected to the interface,
wherein the processor is configured to acquire state information from the first external electronic device on whether the first external electronic device and a second external electronic device are connected to each other through the interface, and the electronic device is configured to receive the second power from the first external electronic device through the interface when the state information belongs to a first designated range; and
supply the first power from a battery of the electronic device to the first external electronic device through the interface when the state information belongs to a second designated range.

13. The electronic device of claim 12, wherein the processor performs USB enumeration when functionally connected to the first external electronic device.

14. The electronic device of claim 12, wherein the interface comprises a first pin for communicating USB data, a second pin for distinguishing the first external electronic device, and a third pin for communicating the first power and the second power with the first external electronic device, and
the state information is acquired from the first external electronic device through the first pin.

15. The electronic device of claim 14, further comprising a charging unit for providing at least one of a charging function for charging the battery, a power path function for supplying third power to the electronic device, and an On-The-Go function for supplying the first power to the first external electronic device.

16. The electronic device of claim 15, wherein the charging unit supplies the first power from the battery to the first external electronic device through the third pin when the On-The-Go function is activated.

17. The electronic device of claim 15, wherein the charging unit activates the charging function based on the state information and charges the battery using the second power supplied by the first external electronic device.

18. The electronic device of claim 15, further comprising a power management unit for managing the second power supplied to the electronic device,
wherein the charging unit activates the power path function based on the state information and supplies the second power supplied by the first external electronic device to the power management unit.

19. The electronic device of claim 15, wherein the processor controls the charging unit to supply the first power to the first external electronic device through the third pin when interruption of power supplied by the third pin is detected in a state in which the first external electronic device is connected.

20. The electronic device of claim 14, wherein the electronic device is configured to receive the state information on a charging current according to a type of the second external electronic device through the first pin, and charge the battery based on the state information on the charging current.

21. The electronic device of claim 12, wherein the second external electronic device comprises one of a charging adaptor and an auxiliary battery for supplying power to the first external electronic device.

22. The electronic device of claim 12, wherein the electronic device comprises a USB device class, and the state information is a type of data corresponding to the USB device class.

23. The electronic device of claim 22, wherein the USB device class comprises at least one of a keyboard, a mouse, a touch pad, a VR sensor, an audio device, and a video device, and the state information comprises at least one of a corresponding type of a key value, a mouse coordinate value, a touch coordinate value, a VR sensor value, and an audio or video device control signal value.

24. A non-transitory computer-readable recording medium for storing programs for executing operations comprising, in an electronic device:

receiving power from a first external electronic device electrically connected to the electronic device through a first interface;

determining whether a second external electronic device is electrically connected to the electronic device through a second interface;

generating state information when the second external electronic device is connected to the electronic device;

transmitting the state information to the first external electronic device through the first interface;

receiving power from the second external electronic device through the second interface when the power reception from the first external electronic device is stopped in response to the transmission of the state information; and supplying at least a part of the power to the first external electronic device through the first interface.

25. A non-transitory computer-readable recording medium for storing programs for executing operations comprising, in an electronic device:

acquiring state information on whether a first external electronic device and a second external electronic device are connected to each other, through a first pin for communicating USB data with the first external electronic device for the electronic device;

receiving first power from the first external electronic device through a second pin for communicating power with the first external electronic device when the state information belongs to a first designated range; and supplying second power to the first external electronic device through the second pin when the state information belongs to a second designated range.

* * * * *